(12) United States Patent
Kasslin et al.

(10) Patent No.: US 8,909,274 B2
(45) Date of Patent: Dec. 9, 2014

(54) METHOD, APPARATUS, AND COMPUTER PROGRAM PRODUCT FOR RESOURCE ALLOCATION CONFLICT HANDLING IN RF FREQUENCY BANDS

(75) Inventors: Mika Kasslin, Espoo (FI); Jari Henrik Junell, Espoo (FI); Amitav Mukherjee, Irvine, CA (US)

(73) Assignee: Nokia Corporation, Espoo (FI)

( * ) Notice: Subject to any disclaimer, the term of this patent is extended or adjusted under 35 U.S.C. 154(b) by 390 days.

(21) Appl. No.: 13/417,457

(22) Filed: Mar. 12, 2012

(65) Prior Publication Data

US 2013/0237264 A1    Sep. 12, 2013

(51) Int. Cl.
*H04B 7/00*     (2006.01)
*H04W 72/00*   (2009.01)

(52) U.S. Cl.
USPC ...... 455/509; 455/513; 455/452.1; 455/67.11

(58) Field of Classification Search
CPC .............................. H04W 72/06; H04W 16/10
USPC ........ 455/452.1, 509, 451, 67.11, 412.2, 453, 455/500, 512, 513, 447; 370/329
See application file for complete search history.

(56) References Cited

U.S. PATENT DOCUMENTS

| | | | |
|---|---|---|---|
| 7,826,459 B2 | 11/2010 | Xhafa et al. | |
| 7,830,907 B1 | 11/2010 | Petranovich et al. | |
| 7,856,008 B2 | 12/2010 | Ayyagari et al. | |
| 7,915,867 B1 | 3/2011 | Bulthaup et al. | |
| 7,953,412 B2 | 5/2011 | Lee et al. | |
| 7,983,216 B2 | 7/2011 | Iyer et al. | |
| 8,068,440 B2 | 11/2011 | Stanwood et al. | |
| 8,165,106 B2 | 4/2012 | Yang et al. | |
| 8,194,549 B2 | 6/2012 | Huber et al. | |
| 8,300,624 B2 | 10/2012 | Zeller et al. | |
| 8,363,579 B2 | 1/2013 | Li et al. | |
| 8,379,551 B2 | 2/2013 | Wietfeldt et al. | |
| 2003/0058829 A1 | 3/2003 | Batra | |
| 2005/0027871 A1 | 2/2005 | Bradley et al. | |
| 2006/0002326 A1 | 1/2006 | Vesuna | |
| 2006/0286986 A1 | 12/2006 | Kim et al. | |

(Continued)

FOREIGN PATENT DOCUMENTS

| | | |
|---|---|---|
| EP | 1863303 | 12/2007 |
| EP | 1883258 | 1/2008 |

(Continued)

OTHER PUBLICATIONS

International Search Report for International Application No. PCT/FI2012/050522 mailed Sep. 25, 2012.

(Continued)

*Primary Examiner* — John J Lee
(74) *Attorney, Agent, or Firm* — Locke Lord LLP

(57) ABSTRACT

Method, apparatus, and computer program product embodiments are disclosed to for efficient radio spectrum use, and more particularly to the resolution of resource allocation conflicts in RF white spaces. An example embodiment includes a method including calculating by a network controller, a resource allocation proposal for a wireless network; transmitting by the network controller, a message including the calculated resource allocation proposal, to one or more other network controllers; and implementing the resource allocation proposal, if the network controller does not receive other resource allocation proposals for the wireless network from the one or more other network controllers, in response to the transmitted message.

33 Claims, 18 Drawing Sheets

(56) References Cited

U.S. PATENT DOCUMENTS

| | | |
|---|---|---|
| 2007/0086426 A1 | 4/2007 | Bonta et al. |
| 2007/0135162 A1 | 6/2007 | Banerjea et al. |
| 2007/0161364 A1 | 7/2007 | Surineni et al. |
| 2007/0207800 A1 | 9/2007 | Daley et al. |
| 2007/0254596 A1 | 11/2007 | Corson et al. |
| 2007/0274273 A1 | 11/2007 | Grushkevich et al. |
| 2008/0040452 A1 | 2/2008 | Rao et al. |
| 2008/0043705 A1 | 2/2008 | Desai et al. |
| 2008/0089279 A1 | 4/2008 | Hu et al. |
| 2008/0108363 A1 | 5/2008 | Yu et al. |
| 2008/0108365 A1 | 5/2008 | Buddhikot et al. |
| 2008/0137627 A1 | 6/2008 | Fischer et al. |
| 2008/0159258 A1 | 7/2008 | Ji et al. |
| 2008/0192806 A1 | 8/2008 | Wyper et al. |
| 2008/0228878 A1 | 9/2008 | Wu et al. |
| 2008/0233875 A1 | 9/2008 | Desai et al. |
| 2008/0253341 A1 | 10/2008 | Cordeiro et al. |
| 2008/0261639 A1 | 10/2008 | Sun et al. |
| 2008/0268892 A1 | 10/2008 | Hamdi et al. |
| 2008/0285525 A1 | 11/2008 | Hu |
| 2008/0298310 A1 | 12/2008 | Hu |
| 2009/0040937 A1 | 2/2009 | Xhafa et al. |
| 2009/0059856 A1 | 3/2009 | Kermoal et al. |
| 2009/0122755 A1 | 5/2009 | Seok et al. |
| 2009/0149208 A1 | 6/2009 | Huttunen et al. |
| 2009/0161614 A1 | 6/2009 | Grandblaise et al. |
| 2009/0196180 A1 | 8/2009 | Bahl et al. |
| 2009/0197627 A1 | 8/2009 | Kuffner et al. |
| 2009/0225717 A1 | 9/2009 | Banerjea |
| 2009/0247201 A1 | 10/2009 | Ye et al. |
| 2009/0279449 A1 | 11/2009 | Kneckt et al. |
| 2009/0279491 A1 | 11/2009 | Kim et al. |
| 2009/0298522 A1 | 12/2009 | Chaudhri et al. |
| 2010/0002608 A1 | 1/2010 | Goldhamer |
| 2010/0046440 A1 | 2/2010 | Singh |
| 2010/0087216 A1 | 4/2010 | Ko et al. |
| 2010/0091736 A1 | 4/2010 | Kim et al. |
| 2010/0097950 A1 | 4/2010 | Jeon |
| 2010/0097952 A1 | 4/2010 | McHenry et al. |
| 2010/0142463 A1 | 6/2010 | Hu |
| 2010/0220676 A1 | 9/2010 | Grandblaise et al. |
| 2010/0220687 A1 | 9/2010 | Reznik et al. |
| 2010/0232380 A1 | 9/2010 | Choi et al. |
| 2010/0248631 A1 | 9/2010 | Chaudhri et al. |
| 2010/0273426 A1 | 10/2010 | Walley et al. |
| 2010/0304685 A1 | 12/2010 | Wietfeldt et al. |
| 2010/0309317 A1 | 12/2010 | Wu et al. |
| 2010/0309806 A1 | 12/2010 | Wu et al. |
| 2010/0331029 A1 | 12/2010 | Linsky et al. |
| 2011/0039554 A1 | 2/2011 | Bims |
| 2011/0090887 A1 | 4/2011 | Kim et al. |
| 2011/0090890 A1 | 4/2011 | Seok et al. |
| 2011/0116488 A1 | 5/2011 | Grandhi |
| 2011/0179174 A1 | 7/2011 | Kasslin et al. |
| 2011/0199989 A1 | 8/2011 | Wietfeldt et al. |
| 2011/0207411 A1 | 8/2011 | Phillips |
| 2011/0222493 A1 | 9/2011 | Mangold et al. |
| 2011/0243094 A1 | 10/2011 | Dayal et al. |
| 2011/0250857 A1 | 10/2011 | Reial et al. |
| 2011/0250921 A1 | 10/2011 | Reial |
| 2011/0287802 A1 | 11/2011 | Ma et al. |
| 2011/0305206 A1 | 12/2011 | Junell et al. |
| 2011/0310767 A1 | 12/2011 | Hu |
| 2012/0057533 A1* | 3/2012 | Junell et al. .................. 370/329 |
| 2012/0069746 A1 | 3/2012 | Park |
| 2012/0077506 A1 | 3/2012 | Wietfeldt et al. |
| 2012/0094681 A1* | 4/2012 | Freda et al. ................. 455/452.1 |
| 2012/0106512 A1 | 5/2012 | Banerjea et al. |
| 2012/0127011 A1 | 5/2012 | Lee et al. |
| 2012/0134328 A1 | 5/2012 | Gauvreau et al. |
| 2012/0182883 A1 | 7/2012 | Junell et al. |
| 2012/0195269 A1 | 8/2012 | Kang et al. |
| 2012/0201209 A1 | 8/2012 | Lee et al. |
| 2012/0225662 A1 | 9/2012 | Jo et al. |
| 2012/0329384 A1 | 12/2012 | Boldyrev et al. |
| 2013/0155995 A1 | 6/2013 | Jo et al. |

FOREIGN PATENT DOCUMENTS

| | | |
|---|---|---|
| EP | 2083591 | 7/2009 |
| GB | 2461724 | 1/2010 |
| JP | 2009153136 A | 7/2009 |
| JP | 2012147256 | 8/2012 |
| JP | A 201229177 | 9/2012 |
| WO | 03001742 | 1/2003 |
| WO | 2005045689 | 5/2005 |
| WO | 20070131958 | 3/2007 |
| WO | 2010027308 | 3/2010 |
| WO | 2010043270 | 4/2010 |
| WO | 2011022506 | 2/2011 |
| WO | WO 2012028769 | 3/2012 |
| WO | WO 2012030174 | 3/2012 |
| WO | WO 2012051303 | 4/2012 |

OTHER PUBLICATIONS

IEEE P802.15.2 Draft No. 09; Coexistence of Wireless Personal Area Networks with Other Wireless Devices Operating in Unlicensed Frequency Bands; Mar. 24, 2003, IEEE Inc. Standards.

J. Zhu, et al.,: Multi-Radio Coexistence: Challenges and Opportunities; Proceedings 16th International Conference on Computer Communications and Networks; Aug. 3, 2007, pp. 358-364.

Japanese Office Action dated Feb. 21, 2014 for Japanese Application No. 2013-038446.

Extended European Search Report for Application No. 13154998.2-1854, completed Jun. 5, 2013.

Extended European Search Report for Application No. 13155031.1-1854, completed Jun. 6, 2013.

Baykas, T et al. Developing a standard for TV white space coexistence: technical challenges and solution approaches. IEEE Wireless Communications, Feb. 1, 2012, pp. 10-22, ISSN 1536-1284. the whole document.

International Search Report for International Application No. PCT/FI2013/050717 mailed Nov. 5, 2013.

"Part 15.2: Coexistence of Wireless Personal Area Networks with Other Wireless Devices Operating in Unlicensed Frequency Bands" Mar. 24, 2003, IEEE, Inc.

J. Zhu, et al., Multi-Radio Coexistence: Challenges and Opportunities; "Proceedings—16th International Conference on Computer Communications and Networks", Aug. 3, 2007; pp. 358-364.

J. Junell, et al.; IEEE P802.19, Wireless Coexistence, Proposal on coexistence system services and protocols; Nov. 7, 2010, XP002681996; pp. 1-46.

J. Junell, et al.; Coexistence for unlicensed spectrum users in white spaces; Applied Sciences in Biomedical and Communication Technologies (ISABEL); 3rd International Symposium on, IEEE; Nov. 7, 2010, pp. 1-5.

Extended European Search Report dated Aug. 30, 2012 for EP Application No. 12162039.7-1525.

IEEE 802.15.2 (Part 15.2: Coexistence of Wireless Personal Area Networks with Other Wireless Devices Operating in Unlicensed Frequency Bands, dated Mar. 24, 2003; hereinafter IEEE 802.15.2.

Zhu et al (Proceedings—16th International Conference on Computer Communications and Networks, paper submitted "Multi-Radio Coexistence: Challenges and Opportunities" dated Aug. 13-16, 2007.

Chen Sun et al., "TVWS Coexistence Use Cases", IEEE 802.19 DCN 19-10-0008-01-0000, pp. 1-14.

T. Baykas, et al; IEEE P802.19-10/0055r3 Wireless Coexistence—System Design Document; Mar. 18, 2010, p. 1-15.

M. Rahman; IEEE 802.19-10-0010-00-tvws; Possible Coexistence Cases in TVWS and Topics to be Considered in P802.19.1; Jan. 1, 2009; pp. 1-10.

Sherman, M.; sg-whitespace-09-0055-00-0000 TV Whitespace Tutorial; Mar. 10, 2009.

Ruuska P. et al. "P802.19 System Architecture", IEEE Mentor, IEEE Standards Association, doc.: IEEE 802.19-10/46r3, Mar. 17, 2010,

(56) References Cited

OTHER PUBLICATIONS

[online], [retrieved on Dec. 1, 2011]. Retrieved from the Internet: <URL: https:// mentor.ieee.org/802.19/documents>.
Harada et al., "Research, Development, and Standards Related Activities on Dynamic Spectrum Access and cognitive Radio", New Frontiers in Dynamic Spectrum, 2010 IEEE Symposium on Apr. 6, 2010, IEEE, Piscataway, NJ, USA.
Akyildiz I. et al., "Next Generation/Dynamic Spectrum Access/Cognitive Radio Wireless Networks: A survey", Sep. 15, 2006, Elsevier Science Publishers B.V., Amsterdam, NL, ISSN 1389-1286, pp. 2127-2159.
J. C. Zuniga, et al; IEEE 802-SG-WhiteSpace-09/0032r4; Media Independent Coexistence; Mar. 11, 2009, p. 1-10 Cavalcanti et al, "IEEE 802.22-07/0121 r1 : Proposed text changes to Section 6.21.2 Self-coexistence in IEEE 802.22/D0.2 Draft Standard" published in Mar. 2007.
H. Wang, et al; IEEE 802.19-09/0034r3; Media Independent Coexistence for Devices in White Space; Jul. 10, 2009, p. 1-12.
M. Kasslin; IEEE 802.19-10/0055r02; Wireless Coexistence; System Design Document; Mar. 18, 2010, p. 1-12.
Cavalcanti et al, "IEEE 802.22-07/0121 r1 : Proposed text changes to Section 6.21.2 Self-coexistence in IEEE 802.22/D0.2 Draft Standard" published in Mar. 2007.
Cordeiro et al, "Cognitive PHY and MAC Layers for Dynamic Spectrum Access and Sharing of TV Bands", published by ACM on Aug. 5, 2006.
European Search Report dated Jun. 27, 2012 for European Application No. 12155105.5-1525.
International Search Report and Written Opinion mailed Mar. 14, 2012 in International Application Serial No. PCT/FI2011/051128, 15pp.
International Search Report and Written Opinion mailed Apr. 2, 2012 in International Application Serial No. PCT/FI2011/051127, 15pp.
International Search Report and Written Opinion mailed Dec. 12, 2011 for International Application Serial No. PCT/FI2011/050777, 12pp.
International Search Report for International Application No. PCT/FI2011/050591 dated Sep. 28, 2011.
International Search Report issued Oct. 11, 2011 in International Application Serial No. PCT/FI2011/050703, 13 pp.
Karama Hamdi, et al., "Power Control in Cognitive Radio Systems Based on Spectrum Sensing Side Information", Proc. IEEE International Conference on Communications (ICC'07), pp. 5161-5165, Jun. 2007.
Ian F. Akyildiz, et al. "A Survey on Spectrum Management in Cognitive Radio Networks", IEEE Communications Magazine • Apr. 2008, pp. 40-48.
Dong In Kim, et al., "Joint Rate and Power Allocation for Cognitive Radios in Dynamic Spectrum Access Environment", IEEE Transactions on Wireless Communications, Vol. 7, No. 12, Dec. 2008, pp. 5517-5527.

Fabrizio Granelli, et al., "Standardization and Research in Cognitive and Dynamic Spectrum Access Networks: IEEE SCC41 Efforts and Other Activities", IEEE Communications Magazine • Jan. 2010, pp. 71-79.
Zander, "Can We Find (and Use) "Spectrum Holes"? Spectrum Sensing and Spatial Reuse Opportunities in "Cognitive" Radio Systems", Vehicular Technology Conference, 2009. VTC Spring 2009. IEEE 69th, Date: Apr. 26-29, 2009, pp. 1-5.
H. Harada, "Research and development on cognitive and software radio technologies—Devices and hardware platform-" General assembly of URSI, Aug. 2008., 4pp.
A. Mody et al., A Survey of IEEE Standards Supporting Cognitive Radio and Dynamic Spectrum Access. IEEE, 978-1-4244-2677-5/08, pp. 1-7.
R. Venkatesha Prasad et al., "Cognitive Functionality in Next Generation Wireless Networks: Standardization Efforts", IEEE Communications Magazine, Apr. 2008, pp. 72-78.
Dong Heon Lee et al., "Self-coexistence techniques for cognitive radio LANs/PANS", 21st Annual IEEE International Symposium on Personal Indoor and Mobile Radio Communications (PIMRC), Sep. 26, 2010, IEEE, Piscataway, NJ, USA, pp. 1516-1520, Chapter III B.
Ashraf, I. et al., "Impact of Interfering Bluetooth Piconets on a Collocated p-Persistent CSMA-Based VVLAN", IEEE Transactions on Vehicular Technology, vol. 58, No. 9, Nov. 1, 2009, pp. 4962-4975.
Asterjadhi, A. et al., "JENNA: A jamming Evasive Network-Coding Neighbor-Discovery Algorithm for Cognitive radio Networks", IEEE Wireless Communications, vol. 17, No. 4, Aug. 1, 2010, pp. 24-32.
Baykas, T., et al., "Overview of TV White Spaces: Current regulations, standards and coexistence between secondary users"' 2010 IEEE 21st International Symposium on Personal, Indoor and Mobile Radio Communications Workshops (PIMRC Workshops), Sep. 26-30, 2010, Istanbul, Turkey, IEEE, Piscataway, NJ, USA, pp. 38-43.
Peha, J.M.: "Sharing Spectrum Through Spectrum Policy reform and Cognitive Radio", Proceedings of teh IEEE, vol. 97, No. 4, Apr. 1, 2009, pp. 708-719.
P. Camarda et al., "An Exclusive Self-Coexistence (ESC) Resource Sharing Algorithm for Cognitive 802.22 Networks," 2010 5th International Symposium on Wireless Pervasive Computing (ISWPC), pp. 128-133.
Mark Cummings, "Perspectives on Architecture for IEEE 802.191.1", Nov. 11, 2010, pp. 1-15.
S. Filin et al., P802.19.1 General Architecture, IEEE 802.19-10-00007, Jan. 16, 2010, pp. 1-9.
Minnie Ingersoll, "White Spaces Database," IEEE 802.19-09-/0047r0, Jul. 16, 2009, pp. 1-23.
Paine et al., "WhiteSpace Coexistence Use Cases", IEEE P802.19 Wireless Coexistence, IEEE 802.19-09/26r4, Jul. 16, 2009, pp. 1-14.

\* cited by examiner

CASE 1

CASE 2

CASE 3

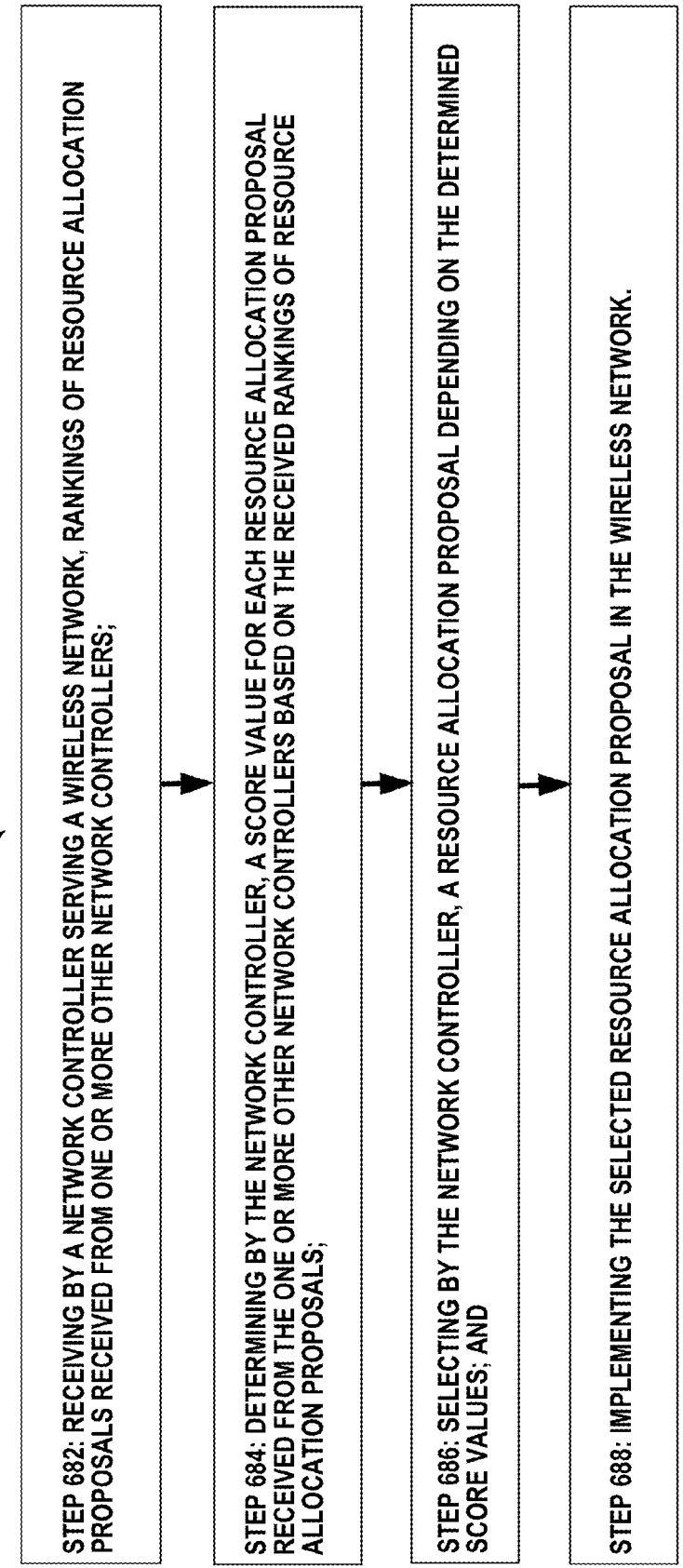

METHOD, APPARATUS, AND COMPUTER PROGRAM PRODUCT FOR RESOURCE ALLOCATION CONFLICT HANDLING IN RF FREQUENCY BANDS

FIELD

The field of the invention relates to efficient radio spectrum use, and more particularly to the resolution of resource allocation conflicts in RF white spaces.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, mobile networks such as CDMA2000, WCDMA, HSPA, LTE, and IMT, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. Unassigned or un-used frequencies also appear locally inside the frequency bands, which are otherwise allocated in other locations. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC proposes two mechanisms to enable the unlicensed transmitter to discover the available channels: geo-location and database based approach, and spectrum sensing. The use of one of the mechanisms is required for the unlicensed transmitter. The FCC proposed the use of geolocation to establish the location of the unlicensed transmitter and a database of TV bands use by licensed broadcasters organized by their geographic coverage areas, to enable the unlicensed transmitter to know where local TV band white spaces may be available. The FCC proposed the use of spectrum sensors in the unlicensed transmitter to detect the presence of the incumbent, primary TV broadcaster's signal in the local TV band to enable the unlicensed transmitter to immediately relinquish using the band. A primary user in such a local TV band would be an incumbent TV broadcaster licensed to operate in that band, but in those geographic areas where there are no licensed incumbent TV broadcasters in operation, other unlicensed secondary users may make use of that band. There may be also other incumbent users in the TV band, which the secondary users should avoid, such as program making and special events (PMSE) systems.

In addition to the United States, other countries are also considering to enable unlicensed, secondary operation in TV band white spaces. The requirements may slightly differ in different countries, e.g. in the United States the maximum transmit power for unlicensed device is defined based on the device type, whereas in Europe location specific maximum transmission power has been considered. In that case the maximum allowed transmission power for an unlicensed device would depend on the device geo-location, i.e. the distance from the primary users. The device characteristics, such as emission mask/ACLR (adjacent channel leakage ratio) may affect the maximum allowed transmission power.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band. Further, other schemes of secondary use of spectrum, other than unlicensed schemes may exist, such as licensing, regulator defined policies, cognitive principles, or authorized shared access.

SUMMARY

Method, apparatus, and computer program product embodiments are disclosed to for efficient radio spectrum use, and more particularly to the resolution of resource allocation conflicts in RF white spaces.

An example embodiment of the invention includes a method comprising:

calculating by a network controller, a resource allocation proposal for a wireless network;

transmitting by the network controller, a message including the calculated resource allocation proposal, to one or more other network controllers; and implementing the resource allocation proposal, if the network controller does not receive other resource allocation proposals for the wireless network from the one or more other network controllers, in response to the transmitted message.

An example embodiment of the invention includes a method comprising:

ranking by the network controller, if the network controller receives other resource allocation proposals for the wireless network from the one or more other network controllers in response to the transmitted message, the other resource allocation proposals; and transmitting by the network controller, a result of the ranking of the other resource allocation proposals, to one or more network controllers serving the wireless network.

An example embodiment of the invention includes a method comprising:

receiving by a network controller, a message including a resource allocation proposal for a wireless network from an originating network controller;

completing a resource allocation proposal calculation for the wireless network, in response to the received message; and transmitting by the network controller, to the originating network controller and zero or more other network controllers, the completed resource allocation proposal.

An example embodiment of the invention includes a method comprising:

ranking by the network controller, the resource allocation proposal received from the originating network controller and zero or more other resource allocation proposals received from zero or more other network controllers respectively, in response to the transmitted message; and transmitting by the network controller, a result of ranking the received one or more resource allocation proposals, to one or more network controllers serving the wireless network.

An example embodiment of the invention includes a method comprising:

receiving by a network controller serving a wireless network, rankings of resource allocation proposals received from one or more other network controllers;

determining by the network controller, a score value for each resource allocation proposal received from the one or more other network controllers based on the received rankings of resource allocation proposals;

selecting by the network controller, a resource allocation proposal depending on the determined score values; and implementing the selected resource allocation proposal in the wireless network.

An example embodiment of the invention includes a method comprising:

receiving by the network controller, a message including a resource allocation proposal for one or more wireless networks neighboring the wireless network from an originating network controller; and completing a resource allocation proposal calculation for the for one or more wireless networks neighboring the wireless network, in response to the message.

An example embodiment of the invention includes a method comprising:

wherein the selected resource allocation proposal has a highest determined score value.

An example embodiment of the invention includes an apparatus comprising:

at least one processor;
at least one memory including computer program code;
the at least one memory and the computer program code configured to, with the at least one processor, cause the apparatus at least to:

calculate a resource allocation proposal for a wireless network;

transmit a message including the calculated resource allocation proposal, to one or more network controllers; and implement the resource allocation proposal, if other resource allocation proposals are not received for the wireless network from the one or more other network controllers, in response to the transmitted message.

An example embodiment of the invention includes an apparatus comprising:

the at least one memory and the computer program code configured to, with the at least one processor, cause the apparatus at least to:

rank, if the apparatus receives other resource allocation proposals from the one or more other network controllers in response to the transmitted message, the other resource allocation proposals; and transmit a result of the ranking of the other resource allocation proposals, to one or more network controllers serving the wireless network.

An example embodiment of the invention includes an apparatus comprising:

at least one processor;
at least one memory including computer program code;
the at least one memory and the computer program code configured to, with the at least one processor, cause the apparatus at least to:

receive a message including a resource allocation proposal for a wireless network from an originating network controller;

complete a resource allocation proposal calculation for the wireless network, in response to the received message; and transmit to the originating network controller and zero or more other network controllers, the completed resource allocation proposal.

An example embodiment of the invention includes an apparatus comprising:

the at least one memory and the computer program code configured to, with the at least one processor, cause the apparatus at least to:

rank the resource allocation proposal received from the originating network controller and zero or more other resource allocation proposals received from zero or more other network controllers respectively, in response to the transmitted message; and transmit a result of ranking the received one or more resource allocation proposals, to one or more network controllers serving the wireless network.

An example embodiment of the invention includes an apparatus comprising:

at least one processor;
at least one memory including computer program code;
the at least one memory and the computer program code configured to, with the at least one processor, cause the apparatus at least to:

receive rankings of resource allocation proposals received from one or more other network controllers, the apparatus serving a wireless network;

determine a score value for each resource allocation proposal received from the one or more other network controllers based on the received rankings of resource allocation proposals;

select a resource allocation proposal depending on the determined score values; and implement the selected resource allocation proposal in the wireless network.

An example embodiment of the invention includes an apparatus comprising:

the at least one memory and the computer program code configured to, with the at least one processor, cause the apparatus at least to:

receive a message including a resource allocation proposal for one or more wireless networks neighboring the wireless network from an originating network controller; and complete a resource allocation proposal calculation for the one or more wireless networks neighboring the wireless network, in response to the message.

An example embodiment of the invention includes an apparatus comprising:

wherein the selected resource allocation proposal has a highest determined score value.

An example embodiment of the invention includes a computer program product comprising computer executable program code recorded on a computer readable, non-transitory storage medium, the computer executable program code comprising:

code for calculating a resource allocation proposal for a wireless network;

code for transmitting a message including the calculated resource allocation proposal, to one or more network controllers; and code for implementing the resource allocation proposal, if other resource allocation proposals are not received for the wireless network from the one or more other network controllers, in response to the transmitted message.

An example embodiment of the invention includes a computer program product further comprising:

code for ranking, if other resource allocation proposals are received from the one or more other network controllers in response to the transmitted message, the other resource allocation proposals; and code for transmitting a result of the ranking of the other resource allocation proposals, to one or more network controllers serving the wireless network.

An example embodiment of the invention includes a computer program product comprising computer executable program code recorded on a computer readable, non-transitory storage medium, the computer executable program code comprising:

code for receiving a message including a resource allocation proposal for a wireless network from an originating network controller;

completing a resource allocation proposal calculation for the wireless network, in response to the received message; and transmitting to the originating network controller and zero or more other network controllers, the completed resource allocation proposal.

An example embodiment of the invention includes a computer program product further comprising:

code for ranking the resource allocation proposal received from the originating network controller and zero or more other resource allocation proposals received from zero or more other network controllers respectively, in response to the transmitted message; and code for transmitting a result of ranking the received one or more resource allocation proposals, to one or more network controllers serving the wireless network.

An example embodiment of the invention includes a computer program product comprising computer executable program code recorded on a computer readable, non-transitory storage medium, the computer executable program code comprising:

code for receiving rankings of resource allocation proposals received from one or more network controllers, by an apparatus serving a wireless network;

code for determining a score value for each resource allocation proposal received from the one or more network controllers based on the received rankings of resource allocation proposals;

code for selecting a resource allocation proposal depending on the determined score values; and code for implementing the selected resource allocation proposal in the wireless network.

An example embodiment of the invention includes a computer program product further comprising:

code for receiving a message including a resource allocation proposal for one or more wireless networks neighboring the wireless network from an originating network controller; and code for completing a resource allocation proposal calculation for the one or more wireless networks neighboring the wireless network, in response to the message.

An example embodiment of the invention includes a computer program product further comprising:

wherein the selected resource allocation proposal has a highest determined score value.

The example embodiments of the invention provide efficient radio spectrum use and resolution of resource allocation conflicts in RF white spaces.

DESCRIPTION OF THE FIGURES

FIG. 6C is an example flow diagram of operational steps in a network controller that serves one or more wireless networks neighboring the wireless network originating the resource allocation request, according to an embodiment of the present invention.

DISCUSSION OF EXAMPLE EMBODIMENTS OF THE INVENTION

Figure 1A:
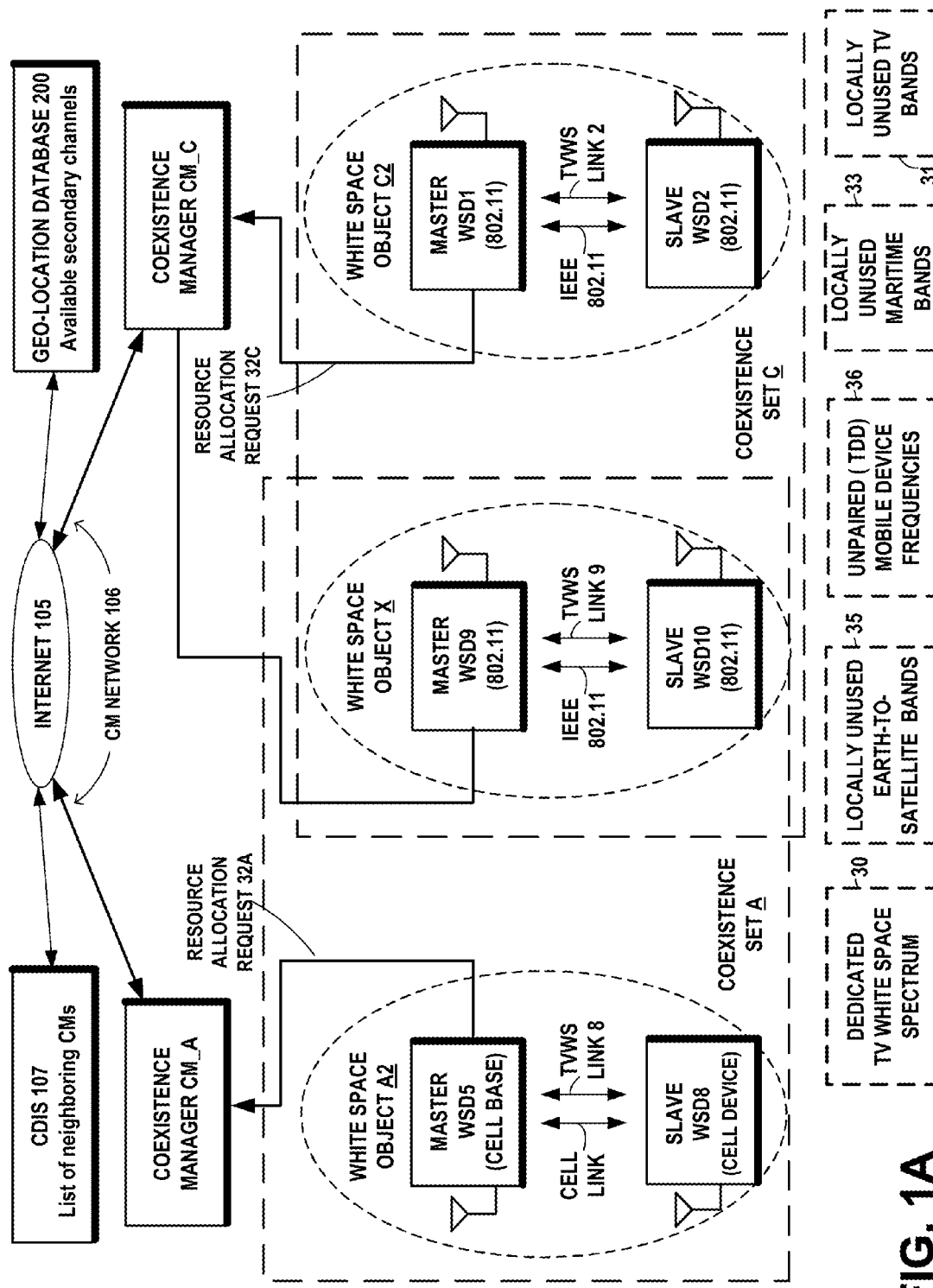
FIG. 1A is a system architecture diagram according to an example embodiment of the invention, illustrating a first and second white space objects (WSOs) each respectively making a resource allocation request for white space spectrum and a third white space object (WSO) that is a neighbor to both the first and second WSOs, wherein a first network controller or coexistence manager CM_A receives a first resource allocation request from the first WSO that it serves, the first WSO including a network of white space devices (WSDs) and a second network controller or coexistence manager CM_C receives a second resource allocation request from the second WSO that it serves, the second WSO including a second network of WSDs, wherein a resource allocation conflict exists between the first and second network controllers or coexistence managers CM_A and CM_C over an allocation of resources for the third WSO that is included in both the first and second coexistence sets, in an example embodiment of the invention.

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used.

The FCC has defined the regulation of white spaces in *Second Memorandum Opinion and Order*, FCC 10-174, Sep. 23, 2010 for secondary white space devices (WSD). In Europe, the European Conference of Postal and Telecommunications Administrations (CEPT) has defined initial requirements in ECC Report 159: *Technical and Operational Requirements for the Possible Operation of Cognitive Radio Systems in the 'White Spaces' of the Frequency Band 470-790 MHz*, January 2011.

Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using any radio technologies adapted for TV white space frequency bands, to access the same TV white space frequency band in the same location without mutual interference.

The IEEE 802.19 Working Group is currently defining coexistence rules for heterogeneous secondary networks. An example embodiment of the invention enables coexistence between heterogeneous secondary networks and coexistence between secondary networks and primary networks that are required to be protected. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable master TVBD devices must be able to access geo-location data or include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geo-location to establish the location of the unlicensed transmitter and a database of TV bands use by licensed broadcasters organized by their geographic coverage areas, to enable the unlicensed transmitter to know where local TV band white spaces may be available. Alternatively, the FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the RF white spaces may require new techniques for fairly sharing the available bandwidth among different heterogeneous secondary networks and accord the required preference for primary users of the band. Such new techniques may require some form of communication between the secondary networks to enable a fair usage of the local spectrum.

A network controller or coexistence manager CM is the main decision maker of the coexistence system. It discovers and solves the coexistence conflicts of the networks operating in the same area. A CM serves one or more networks. Depending on the deployment, it resides either in a TVBD or in the network entity. In independent networks it may reside in a TVBD. The CM discovers the interfering networks and their CMs, and shares information with other CMs. Based on the collected information it reconfigures the operation of its own networks, but also performs resource reallocation for those WSOs in a coexistence set the CM is allowed to, as needed.

In the United States, the WSD may operate as a master WSD of a network of associated slave WSD devices. For example, the master WSD may be an access point or base station. The master WSD is expected to access the geo-location database (DB) on behalf of its slave WSD devices, to discover the available spectrum that is not used by the incumbent users, for example, TV broadcasters.

The following discussion employs terms that are defined as follows:

WSO (White Space Object)=TVBD network or device.
Coexistence set=neighbors.
  Coexistence set is a set of WSOs otherwise referred to as neighbors.
  Each coexistence manager (CM) determines and maintains a coexistence set for each WSO that it serves. A WSO's coexistence set comprises of other WSOs that may interfere the WSO or that the WSO may interfere with.
Coexistence set element=neighbor TVBD network or device
  A WSO that belongs to a coexistence set
Coexistence set extension=Limiting networks (the neighbors of neighbors)
  Each CM has a coexistence set extension for each coexistence set it has (one per WSO the CM serves). The extension comprises those WSOs that belong to the coexistence sets of WSOs in one's own coexistence set, but that do not belong to the one's own coexistence set.

A network controller or coexistence manager may employ distributed decision making to determine resources for the WSOs it serves and for all the WSOs in the coexistence set of the served WSO. This may lead to situations in which two or more CMs simultaneously or concurrently determine a new resource allocation that affects the same WSO. In accordance with an embodiment of the invention, the network controllers or coexistence managers CM of a coexistence management system, employ a conflict handling procedure to deal with situations in which at least two network controllers or coexistence managers are calculating resources that affect the same WSO.

An example conflict handling procedure may be outlined as follows:

In accordance with an embodiment of the invention, a network controller or coexistence manager (CM) receives a resource allocation request from a wireless network or white space object (WSO) originating the request or the resource allocation is triggered by another cause to that WSO. This network controller or coexistence manager (CM) will be referred to as the requesting CM. The WSO making the request is the requesting WSO.

The requesting CM calculates a resource allocation proposal in response to receiving the resource allocation request from the requesting WSO. Since the requesting WSO may occupy a coexistence set that includes neighboring WSOs that may interfere with the requesting WSO or that the requesting WSO may interfere with, the resource allocation proposal may affect the resources used by the neighboring WSOs in the coexistence set.

The requesting CM needs to determine if there are other CMs in the coexistence system that are simultaneously or concurrently calculating resource allocation proposals for any of the WSOs in the coexistence set of the requesting WSO or the requesting WSO. In accordance with an embodiment of the invention, the requesting CM transmits a conflict request and the resource allocation proposal to one or more other network controllers to determine whether they are calculating other resource allocation proposals for the wireless network originating the request or for one or more wireless networks neighboring the wireless network originating the request.

The other CMs that receive the conflict request, prepare a response message indicating whether they are in the process of calculating resources for any of the WSOs in the coexistence set of the requesting WSO. The other CMs each transmit the response message to the requesting CM. If the response is "yes", the responding CM becomes a conflict handling CM.

Once the requesting CM has transmitted a request to each of the other CMs that is authorized to calculate resources for any of the WSOs in the coexistence set of the requesting WSO, and the requesting CM has received responses from all of the other CMs, the requesting CM knows which of the other CMs are conflict handling CMs.

If the requesting CM does not receive other resource allocation proposals from the one or more other network controllers, in response to the conflict request, then the requesting CM implements the resource allocation proposal.

Alternately, the requesting CM waits for responding conflict check requests from all the conflict handling CMs. If the requesting CM receives the other resource allocation proposals from the one or more other network controllers, in response to the original conflict request, then the requesting CM ranks the other resource allocation proposals from the one or more other network controllers.

The requesting CM replies to each of the responding requests from the other CMs with a "yes" response similar to the other CMs that indicated earlier that they were in the process of calculating resources for any of the WSOs in the coexistence set of the requesting WSO.

In the proposal ranking, the requesting CM puts the proposals from the other responding conflict handling CMs in order by giving the highest score (e.g. 5 in case of 5 proposals) to the "best" proposal, the second highest score (e.g. 4 in case of 5 proposals) and so on. The requesting CM does not consider its own proposal in the ranking, but scores only proposals from the other CMs.

The requesting CM transmits a message with the ranking result (scores for all the proposals) to the CMs that serve the WSOs in the coexistence set of the requesting WSO for which the resource allocation proposals have been ranked. In the ranking result message, the requesting CM also indicates the number of responding conflict handling CMs, to ensure that the serving CM knows how many ranking messages to expect and wait for.

If the serving network controller of the WSO in a coexistence set is different from the requesting CM, then the requesting CM transmits the result of ranking to the serving network controller of the WSO in the coexistence set.

Once the serving CM has received all the ranking result messages, it determines which of the allocation proposals has received the highest total score. An example selection procedure is to sum all the scores per proposal and use that as the total score of the proposal. The serving CM may also assign weights to the ranking results received according to some criterion before calculating the sum and the total scores. The serving CM selects the proposal that has the highest total score as the winning proposal. If there are multiple proposals with the highest total score, the serving CM picks up one of them as the winning proposal.

Once the winning proposal has been determined, the serving CM communicates the selected allocation to the relevant CMs and to the WSO that it serves, in the manner it would do in the case without conflicts.

FIG. 1A is a system architecture diagram according to an example embodiment of the invention, illustrating a first white space object (WSO) A2 and second white space object C2 each respectively making a resource allocation request 32A and 32C for white space spectrum and a third white space object X that is a neighbor to both the first WSO A2 and second WSO C2. A first network controller or coexistence manager CM_A receives the first resource allocation request 32A from the first WSO A2 that it serves. The first WSO A2 includes a network of white space devices (WSDs) WSD5 and WSD8 and the second network controller or coexistence manager CM_C receives the second resource allocation request 32C from the second WSO C2 that it serves. The second WSO C2 includes a second network of WSDs WSD1 and WSD2. A resource allocation conflict exists between the first and second network controllers or coexistence managers CM_A and CM_C over an allocation of resources for the third WSO X that is included in both the first and second coexistence sets A and C, in an example embodiment of the invention.

Example white space spectrum in the operating area of a WSD device include dedicated TV white space spectrum 30, locally unused TV bands 31, locally unused maritime bands 33, locally unused satellite bands 35, and locally unpaired (TDD) mobile device frequencies.

FIG. 1A also shows three non-limiting example white space spectra locally unused by licensed primary users of their respective spectrum white spaces, which may be used by the master WSD1 or slave WSD2, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. A non-limiting example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the master WSD1 or slave WSD2, then they could operate as unlicensed secondary users and make use of TV band white space 31. If either master WSD1 or slave WSD2 were to detect a signal transmitted from a neighboring TV broadcaster in band 31, then they would have to relinquish their use of the TV band white space 31 and make a resource request, in accordance with an example embodiment of the invention. Non-limiting examples of white space spectra are available in many parts of the electromagnetic spectrum. For example, white space spectra are available for personal/portable devices in the UHF portion of the spectrum.

A maritime radio operates in a number of licensed frequency allocations and is a primary user in the maritime radio band 33. If there were no licensed maritime radios in operation that would interfere with the master WSD1 or slave WSD2, then they could operate as unlicensed secondary users and make use of maritime radio band 33. If either master WSD1 or slave WSD2 were to detect a signal transmitted from a neighboring maritime radio, then they would have to relinquish their use of the maritime band 33 and make a resource request, in accordance with example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the master WSD1 or slave WSD2, then they could operate as unlicensed secondary users and make use of earth-to-satellite radio band 35. If either master WSD1 or slave WSD2 were to detect a signal transmitted from a neighboring earth station radio, then they would have to relinquish their use of the earth-to-satellite band 35 and make a resource request, in accordance with example embodiments of the invention.

Figure 7:
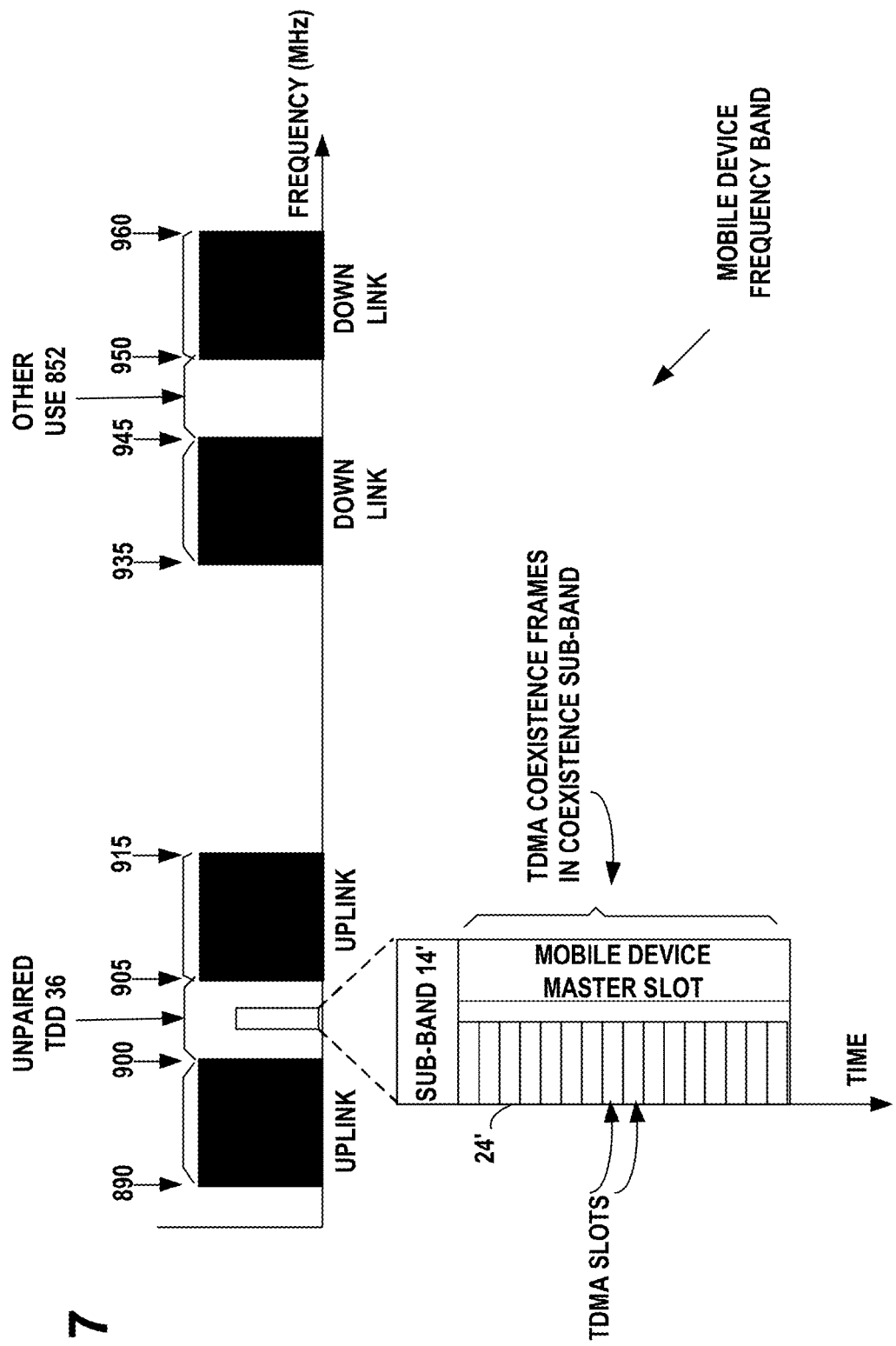
FIG. 7 is an example frequency band diagram illustrating an example TDMA coexistence frame in a sub-band in an unpaired time domain duplex frequency white space in the uplink portion of a mobile device communications frequency band, according to an example embodiment of the invention.

Also shown in FIG. 1A is a second master WSD device WSD5 and its associated slave WSD8 in the second master WSD5's operation area. The master WSD5 uses a cellular 3rd Generation Partnership Project (3GPP) standard, such as Third-Generation (3G), Wideband Code Division Multiple Access (W-CDMA), High Speed Packet Access (HSPA), Long Term Evolution (LTE), LTE Advanced (LTE-A), or International Mobile Telecommunications Advanced (IMT-A), for its normal communications on the cell links, but it is capable of communicating in white space spectrum on TVWS links 6, 7, and 8. The returned information from the geo-location database enables the operation in the white space spectrum, of both the master WSD5 and its associated slave WSD8 that are within the master WSD5's operational area. FIG. 7 shows an example TDMA coexistence frame 24' in sub-band 14' in the unpaired time domain duplex frequency white space 36 in the uplink portion of the mobile device frequency band, which may be used by the cell base master device WSD5 and the cell slave device WSD8 in FIG. 1A. TVWS may be used, for examine, in carrier aggregation, where it is available, in addition to licensed media.

Similar examples include local area technologies implemented for example, cellular technologies for small cell operations such as hotspots, pico cells, femto cells, home nodes such as Home Node B (HNB), Home eNodeB (HeNB) and the like. Further, integrated local nodes of secondary networks may consist of 3GPP technologies combined with the IEEE technologies, for example LTE Home eNodeB (LTE HeNB) with Wi-Fi.

Figure 1B:
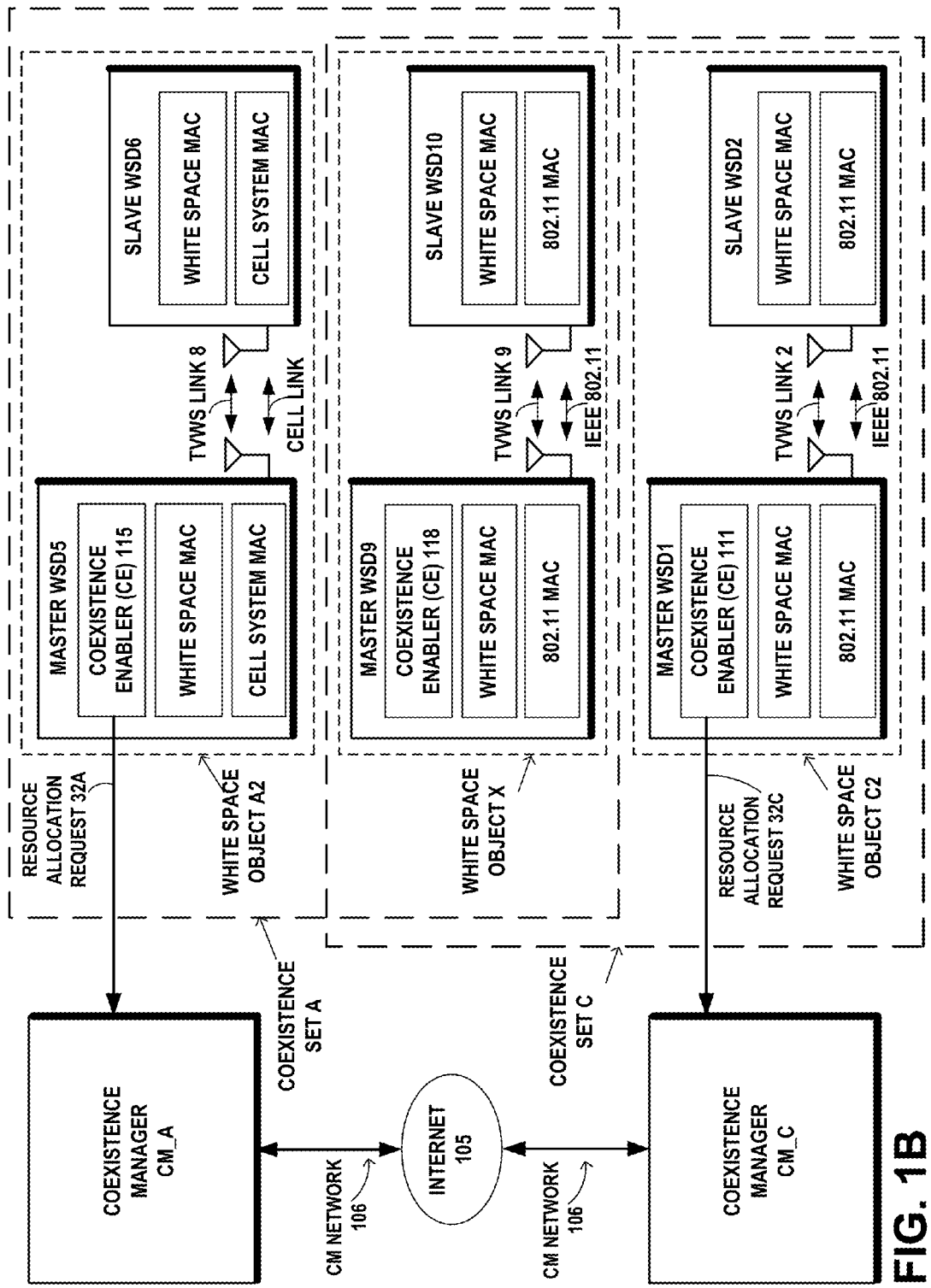
FIG. 1B is an example system architecture according to an example embodiment of the invention, showing the first and second network controllers or coexistence managers CM_A and CM_C of FIG. 1A serving the first and white space objects (WSOs) of FIG. 1A, FIG. 1B further showing the third WSO that is a neighbor to both the first WSO and the second WSO, the combination of the first and third WSOs forming a first coexistence set for the first WSO and the combination of the second and third WSOs forming a second coexistence set for the second WSO, wherein a resource allocation conflict exists between the first and second network controllers or coexistence managers CM_A and CM_C over an allocation of resources for the third WSO that is included in both the first and second coexistence sets, in an example embodiment of the invention.

FIG. 1B is an example system architecture according to an example embodiment of the invention, showing the first and second network controllers or coexistence managers CM_A and CM_C of FIG. 1A serving the first and white space objects (WSOs) A2 and C2 of FIG. 1A. FIG. 1B further shows the third WSO X that is a neighbor to both the first WSO A2 and the second WSO C2. The combination of the first and third WSOs A2 and X form a first coexistence set A for the first WSO A2. The combination of the second and third WSOs C2 and X form a second coexistence set C for the second WSO C2. A resource allocation conflict exists between the first and second network controllers or coexistence managers CM_A and CM_C over an allocation of resources for the third WSO X that is included in both the first and second coexistence sets A and C, in an example embodiment of the invention.

In an example embodiment of the invention, a network of distributed coexistence managers CM_A and CM_C may communicate with one another over the Internet 105. According to an example embodiment of the invention, the control node or coexistence enabler 111 in the master WSD1 may communicate over the Internet 105 with the TVWS coexistence manager CM_C. According to an alternate example embodiment of the invention, the control node or coexistence enabler 111 in the master WSD1 may be collocated with the TVWS coexistence manager CM_C. The coexistence enabler 115 in the master WSD5 may communicate over the Internet 105 with the TVWS coexistence manager CM_A. The distributed coexistence managers CM_A and CM_C may communicate over the Internet 105, in an example embodiment of the invention. Master WSD1 may be registered through the control node or coexistence enabler 111 to the network controller or coexistence manager CM_C. Master WSD5 may be registered through the control node or coexistence enabler 115 to the network controller or coexistence manager CM_A.

The coexistence enabler 111 may obtain information required for coexistence from a traffic network or device representing it. This may include configuration and control of measurements. Also, the coexistence enabler 111 may provide reconfiguration commands and control information to the master WSD1, corresponding to coexistence decisions received from coexistence manager CM_C. The coexistence manager CM_A is responsible for discovery of Coexistence Managers (CM)s CM_C managing neighboring wireless networks, for example, and coexistence related information may be exchanged with them. The coexistence manager CM_A or CM_C may have the needed information to make decisions of resource sharing among the Coexistence Managers (CM)s managing neighboring wireless networks.

The coexistence manager CM_C handles resource requests from the coexistence enabler 111 in master WSD1. The coexistence manager CM_A handles resource requests from the coexistence enabler 115 in master WSD5. The master WSD1 includes IEEE 802.11 MAC and PHY to communicate over its network. The master WSD5 cell system includes a cellular 3GPP standard MAC and PHY to communicate over its network. The coexistence enablers 111 and 115 in master WSD1 and in master WSD5 send resource requests to the respective coexistence managers CM_C and CM_A.

The example system architecture of FIG. 1B shows the coexistence manager CM_C receiving a resource request from the coexistence enabler 111 in master WSD1. The coexistence manager CM_C has received Spectrum sensing results and network parameters from the coexistence enabler 111 in master WSD1. Network parameters may include specific user requirements (user load, QoS, priority, etc), aggregate spectral efficiency, etiquette (first come, first served, etc.), and user or network policies. The coexistence manager CM_C accesses a geo-location database 200 in FIG. 1A to obtain available secondary channels in the TV band white space. The coexistence manager CM_C accesses the coexistence network element coexistence discovery and information server (CDIS) 107 in FIG. 1A to obtain potential neighbor networks' addresses. The coexistence manager CM_C processes this data in conjunction with Spectrum maps, Operational parameters, and Time base sync, to determine a resource reallocation for the coexistence enabler 111 in master WSD1. The coexistence manager CM_C then sends to the coexistence enabler 111 in master WSD1 the resource reallocation, including Operational parameters, Quiet period parameters, Spectrum sensing strategy, and/or Time base sync. The coexistence enabler 111 in master WSD1 then controls at least one of the medium access control (MAC) and the physical layer (PHY) and the Radio resource Control (RRC) and the Radio Resource Management (RRM) to communicate in channels in the TV white spaces band reallocated by the coexistence manager CM_C, without interference from other networks sharing the same white space channels. A similar operation may be carried out by the coexistence manager CM_A in conjunction with the coexistence enabler 115 in master WSD5. A network of distributed coexistence managers CM_C and CM_A may communicate with one another over the Internet 105.

Figure 1C:
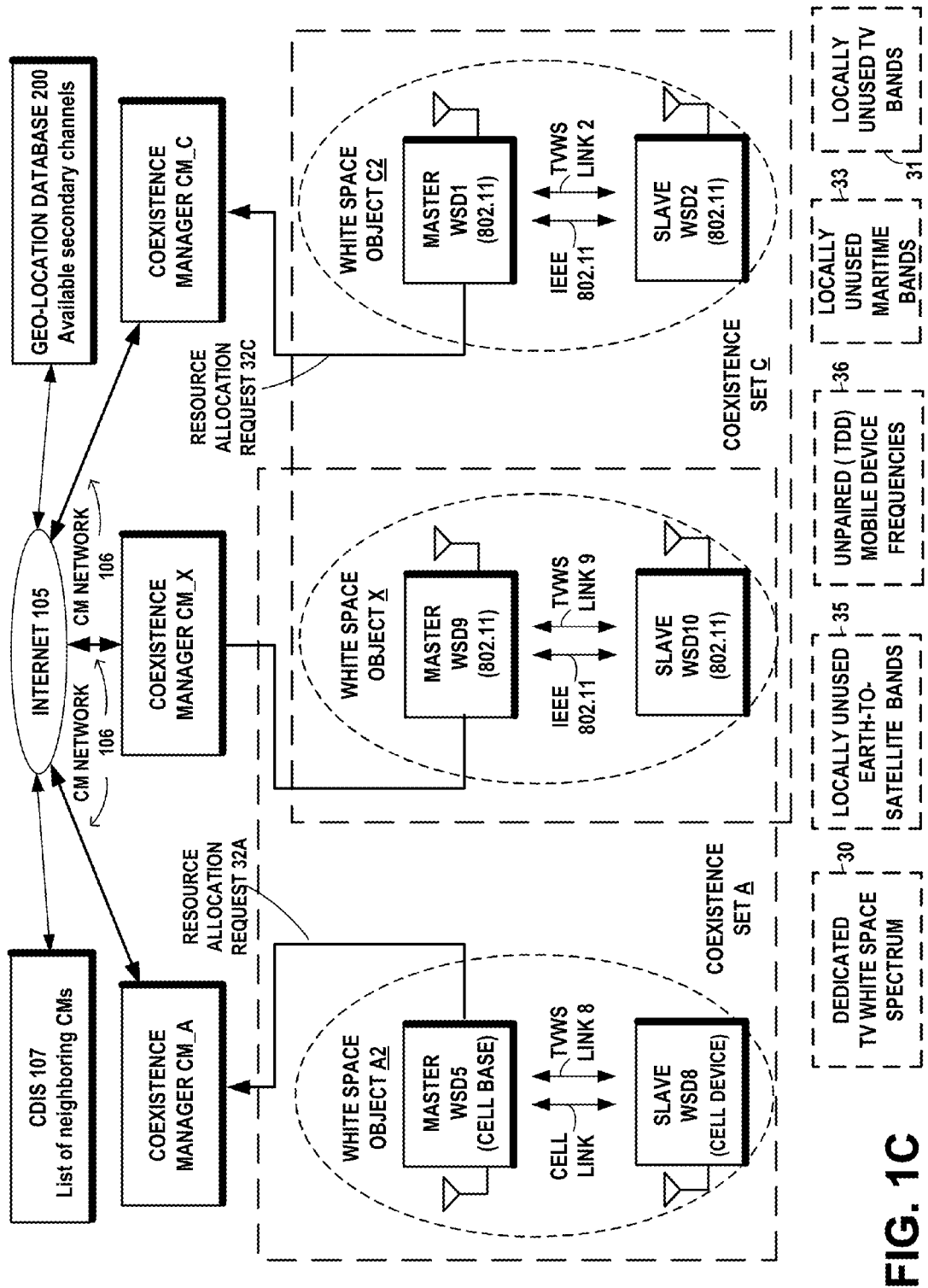
FIG. 1C is an example system architecture according to an example embodiment of the invention, which is a variation of FIG. 1A, showing an additional network controller or coexistence manager CM_X serving the third WSO X that is a neighbor to both the first WSO A2 and the second WSO C2, wherein a resource allocation conflict exists between the first and second network controllers or coexistence managers CM_A and CM_C over an allocation of resources for the third WSO X that is included in both the first and second coexistence sets, in an example embodiment of the invention.

FIG. 1C is an example system architecture according to an example embodiment of the invention, which is a variation of FIG. 1A, showing an additional network controller or coexistence manager CM_X serving the third WSO X that is a neighbor to both the first WSO A2 and the second WSO C2. A resource allocation conflict exists between the first and second network controllers or coexistence managers CM_A and CM_C over an allocation of resources for the third WSO X that is included in both the first and second coexistence sets, in an example embodiment of the invention.

Figure 1D:
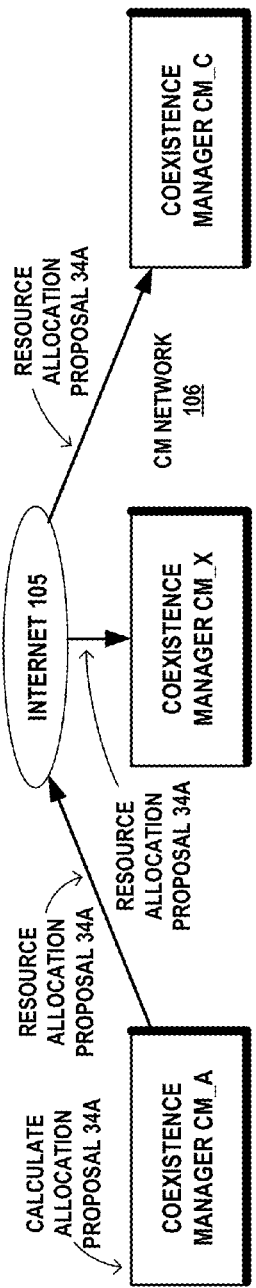
FIG. 1D is an example system architecture according to an example embodiment of the invention of FIG. 1C, which illustrates the network controller or coexistence manager CM_A calculating a first resource allocation proposal 34A that it transmits over the CM network to the network controllers or coexistence managers CM_X and CM_C, in an example embodiment of the invention. The proposal may be transmitted as a multicast transmission as in the example or it may be transmitted as a sequence of unicast transmissions.

FIG. 1D is an example system architecture according to an example embodiment of the invention of FIG. 1C, which illustrates the network controller or coexistence manager CM_A calculating a first resource allocation proposal 34A. The network controller may transmit a message to one or more other network controllers to determine whether they are calculating other resource allocation proposals for the wireless network or for one or more wireless networks neighboring the wireless network. The network controller may transmit the message over the CM network 106 to the network controllers or coexistence managers CM_X and CM_C, in an example embodiment of the invention. The message or the proposal may be transmitted as a multicast transmission as in the example or it may be transmitted as a sequence of unicast transmissions. The resource allocation proposal may be implemented, if the network controller does not receive other resource allocation proposals from the one or more other network controllers, in response to the message.

Figure 1E:
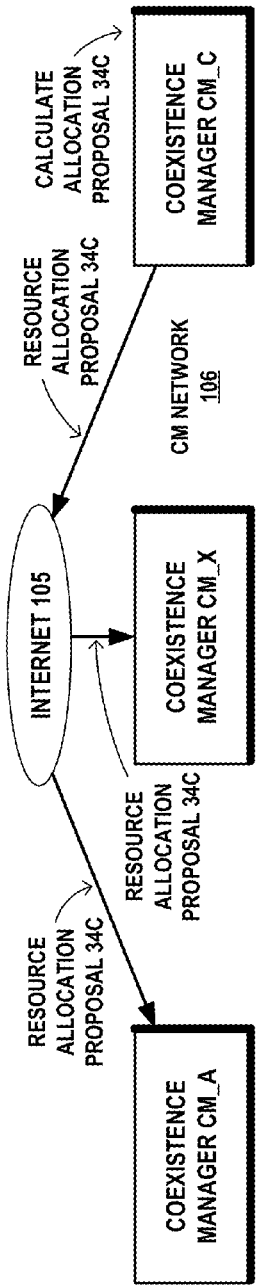
FIG. 1E is an example system architecture according to an example embodiment of the invention of FIG. 1C, which illustrates the network controller or coexistence manager CM_C calculating a second resource allocation proposal 34C that it transmits over the CM network to the network controllers or coexistence managers CM_X and CM_A, in an example embodiment of the invention.

FIG. 1E is an example system architecture according to an example embodiment of the invention of FIG. 1C, which illustrates the network controller or coexistence manager CM_C calculating a second resource allocation proposal 34C. The network controller receives a message from an originating network controller, indicating that the originating network controller has calculated a resource allocation proposal for a wireless network and for one or more wireless networks neighboring the wireless network. The network controller completes a response resource allocation proposal calculation for the wireless network and the one or more wireless networks neighboring the wireless network, in response to the message. The network controller transmits the completed resource allocation proposal over the CM network 106 to the network controllers or coexistence managers CM_X and CM_A, in an example embodiment of the invention. The network controller transmits to the originating network controller, the completed resource allocation proposal.

Figure 1F:
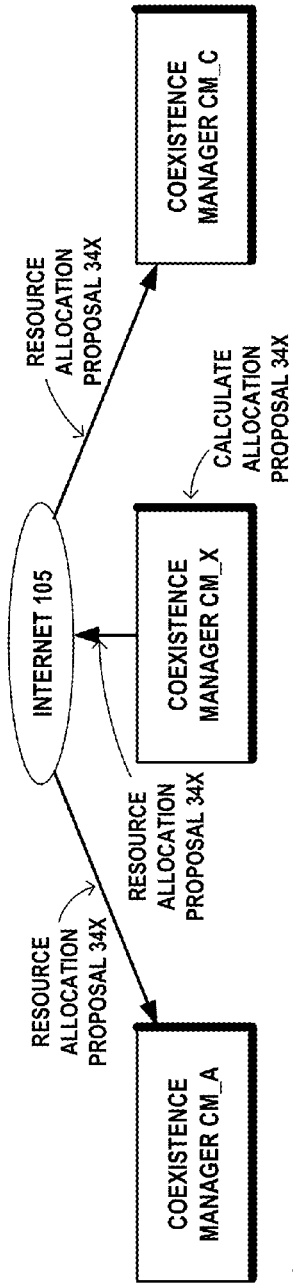
FIG. 1F is an example system architecture according to an example embodiment of the invention of FIG. 1C, which illustrates the network controller or coexistence manager CM_X calculating a third resource allocation proposal 34X that it transmits over the CM network to the network controllers or coexistence managers CM_C and CM_A, in an example embodiment of the invention.

FIG. 1F is an example system architecture according to an example embodiment of the invention of FIG. 1C, which illustrates the network controller or coexistence manager CM_X calculating a third resource allocation proposal 34X that it transmits over the CM network 106 to the network controllers or coexistence managers CM_C and CM_A, in an example embodiment of the invention.

Figure 1G:
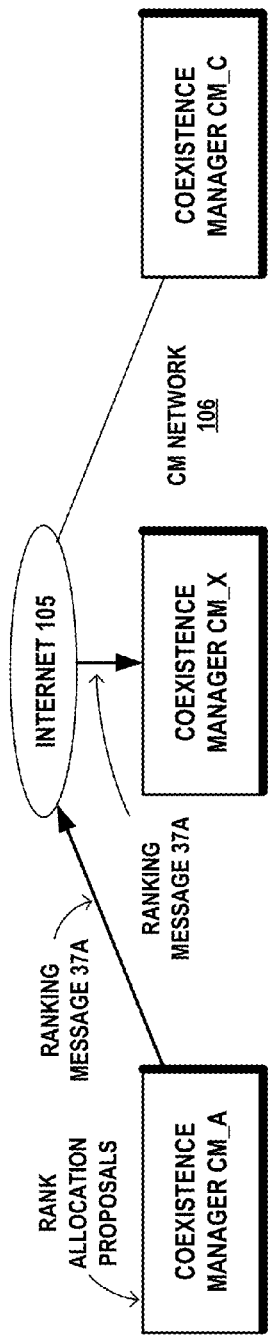
FIG. 1G is an example system architecture according to an example embodiment of the invention of FIG. 1C, which illustrates the network controller or coexistence manager CM_A ranking the resource allocation proposals 34C and 34X that it has received and then unicasts the ranking message 37A over the CM network to the network controller or coexistence manager CM_X that serves the third WSO X that is a neighbor to both the first WSO A2 and the second WSO C2, in an example embodiment of the invention.

FIG. 1G is an example system architecture according to an example embodiment of the invention of FIG. 1C, which illustrates the network controller or coexistence manager CM_A ranking the resource allocation proposals 34C and 34X that it has received. The network controller may rank other resource allocation proposals from the one or more other network controllers, if the network controller receives the other resource allocation proposals from the one or more other network controllers, in response to the message. The ranking may be made independently for each network and the winning allocation may be from a different resource allocation calculation. The network controller may transmit a result of ranking the other resource allocation proposals, to one or more serving network controllers serving the one or more wireless networks neighboring the wireless network. The network controller may unicast the ranking message 37A over the CM network 106 to the network controller or coexistence manager CM_X that serves the third WSO X that is a neighbor to both the first WSO A2 and the second WSO C2, in an example embodiment of the invention.

Figure 1H:
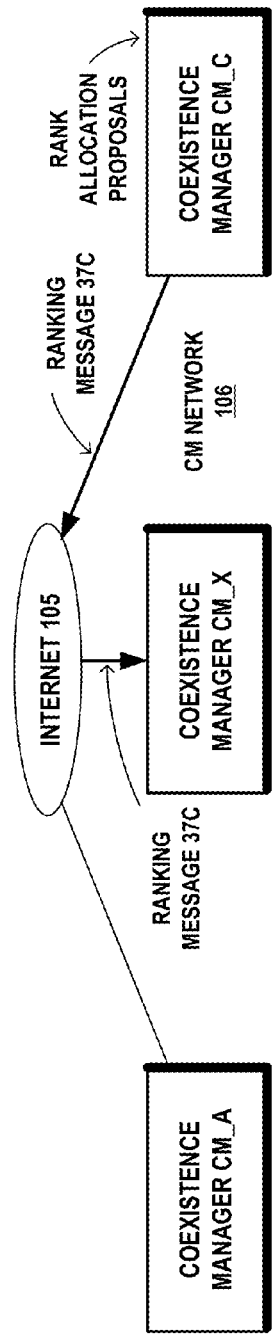
FIG. 1H is an example system architecture according to an example embodiment of the invention of FIG. 1C, which illustrates the network controller or coexistence manager CM_C ranking the resource allocation proposals 34A and 34X that it has received and then unicasts the ranking message 37C over the CM network to the network controller or coexistence manager CM_X that serves the third WSO X that is a neighbor to both the first WSO A2 and the second WSO C2, in an example embodiment of the invention.

FIG. 1H is an example system architecture according to an example embodiment of the invention of FIG. 1C, which illustrates the network controller or coexistence manager CM_C ranking the resource allocation proposals 34A and 34X that it has received. The network controller ranks the resource allocation proposal received from the originating network controller and other resource allocation proposals received from one or more other network controllers, in response to the message. The network controller transmits a result of ranking the received resource allocation proposals, to one or more serving network controllers serving the wireless network and the one or more wireless networks neighboring the wireless network. The network controller unicasts the ranking message 37C over the CM network 106 to the network controller or coexistence manager CM_X that serves the third WSO X that is a neighbor to both the first WSO A2 and the second WSO C2, in an example embodiment of the invention.

Figure 1I:
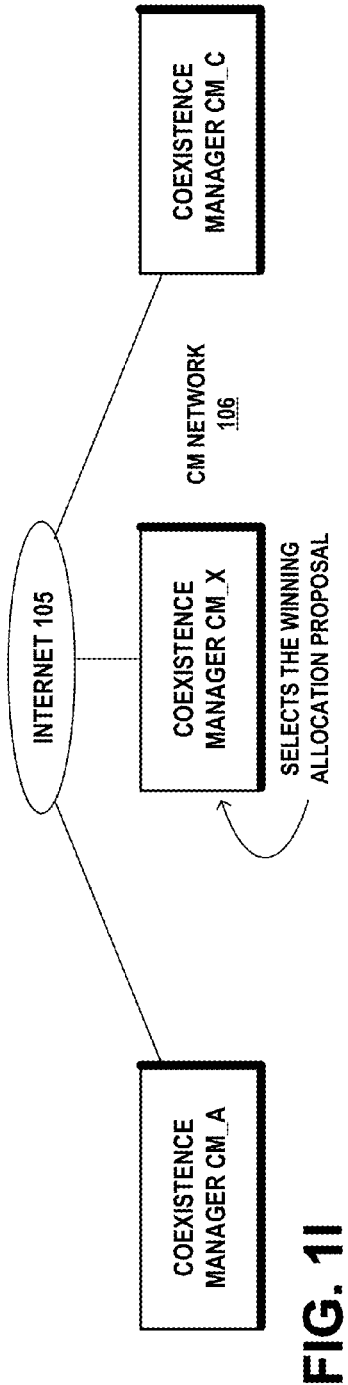
FIG. 1I is an example system architecture according to an example embodiment of the invention of FIG. 1C, which illustrates the network controller or coexistence manager CM_X that serves the third WSO X that is a neighbor to both the first WSO A2 and the second WSO C2, selecting the winning resource allocation proposal based on the ranking messages 37A and 37C that it has received, in an example embodiment of the invention.

FIG. 1I is an example system architecture according to an example embodiment of the invention of FIG. 1C, which illustrates the network controller or coexistence manager CM_X that serves the third WSO X that is a neighbor to both the first WSO A2 and the second WSO C2, selecting the winning resource allocation proposal based on the ranking messages 37A and 37C that it has received, in an example embodiment of the invention. The serving network controller that serves one or more wireless networks neighboring a wireless network, receives a ranking of a resource allocation proposal received from an originating network controller and rankings of other resource allocation proposals received from one or more other network controllers. The network controller selects a resource allocation proposal having a highest ranking from among the resource allocation proposal received from the originating network controller and the rankings of other resource allocation proposals received from the one or more other network controllers. The ranking may be made independently for each network and the winning allocation may be from a different resource allocation calculation. The network controller or coexistence manager CM_X then communicates the selected, winning resource allocation proposal to the network controllers or coexistence managers CM_C and CM_A, as required and implements the winning allocation proposal in the third WSO X. The network controller implements the selected resource allocation proposal in the one or more wireless networks neighboring the wireless network.

The network controller or coexistence manager CM_X receives rankings 37A and 37C of resource allocation proposals 34A and 34C received from one or more other network controllers CM_C and CM_A. The network controller or coexistence manager CM_X serves the wireless network WSO X.

The network controller or coexistence manager CM_X determines a score value for each resource allocation proposal received from one or more other network controllers CM_C and CM_A based on the received rankings of resource allocation proposals.

The network controller or coexistence manager CM_X selects a resource allocation proposal having highest score value.

The network controller or coexistence manager CM_X implements the selected resource allocation proposal in the wireless network WSO X.

Figure 2A:
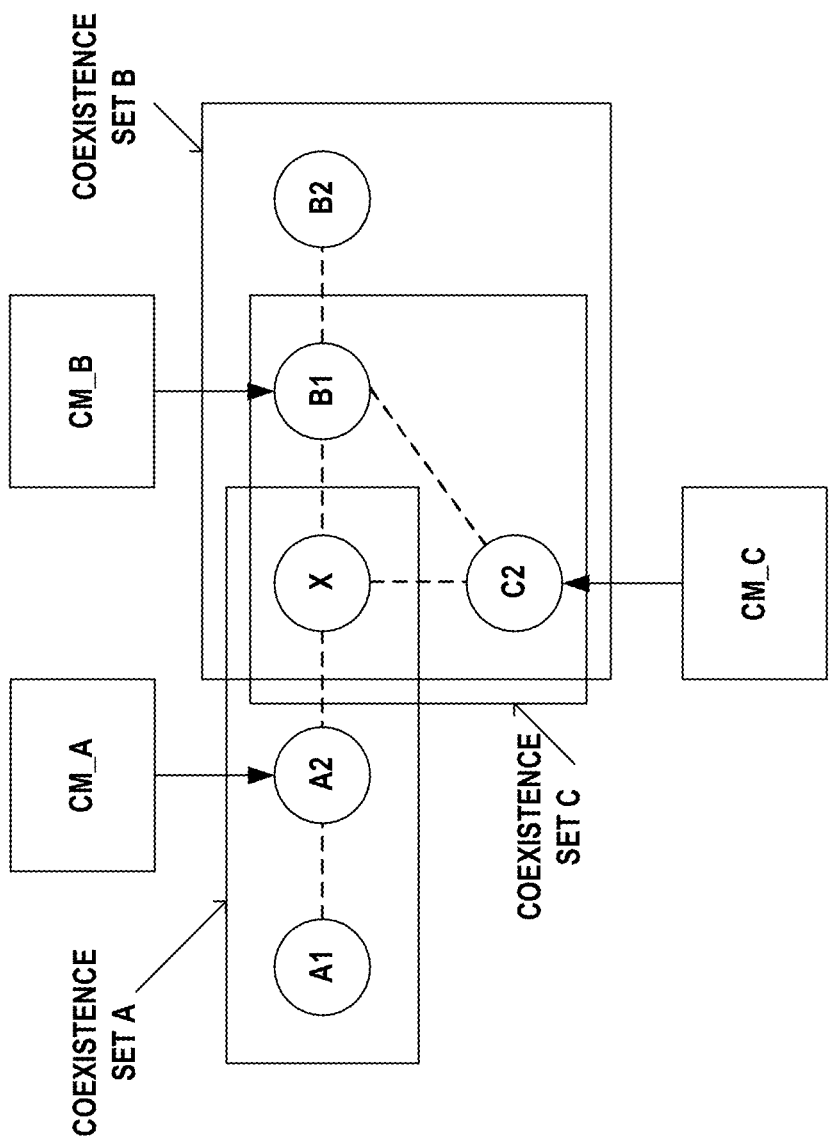
FIG. 2A is an example network diagram according to an example embodiment of the invention, showing an example first case one of the first and second network controllers or coexistence managers CM of FIG. 1B and the first coexistence set for the first WSO and the second coexistence set and FIG. 2A further showing a third network controller or coexistence manager CM and third coexistence set that includes the third WSO that is a neighbor to both the first WSO and the second WSO, wherein the first case illustrates a resource allocation conflict between all three network controllers or coexistence managers CM over an allocation of resources for the third WSO that is included in all three coexistence sets, in an example embodiment of the invention.
Figure 2B:
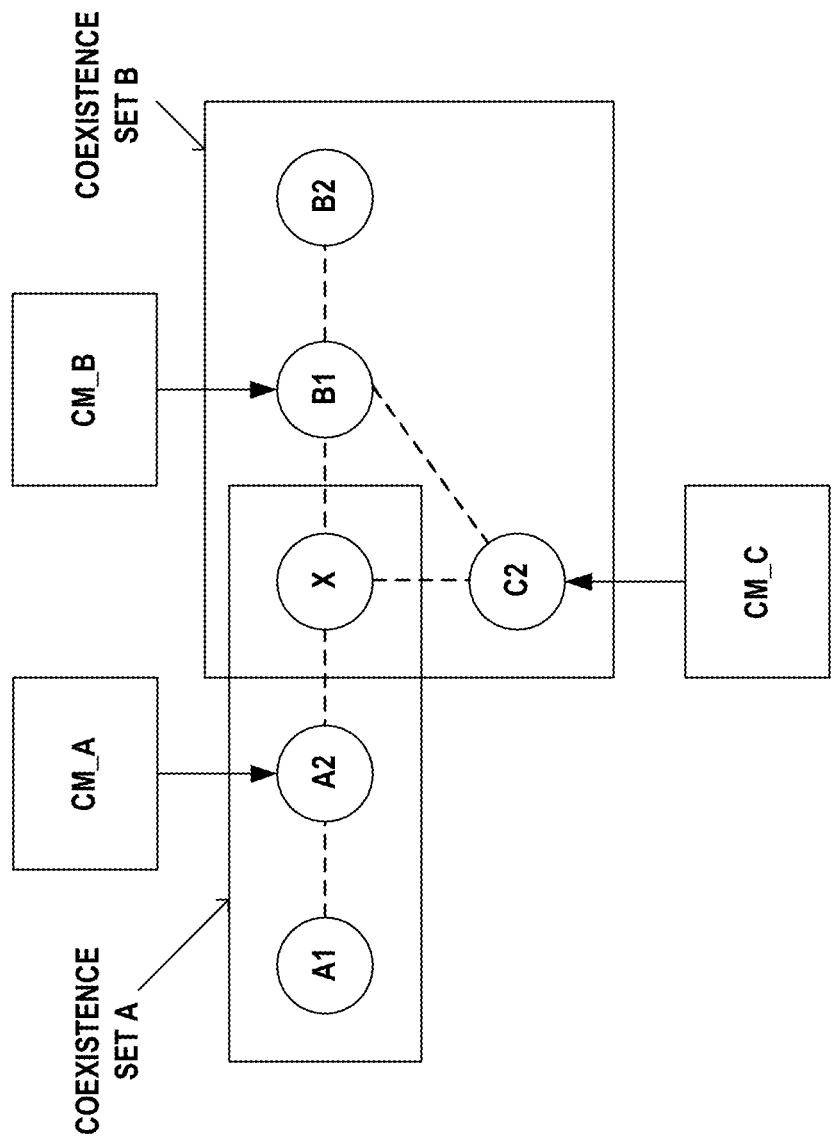
FIG. 2B is the example network diagram of FIG. 2A according to an example embodiment of the invention, showing an example second case of the first, second, and third network controllers or coexistence managers CM of FIG. 2A and the first, second, and third coexistence sets, wherein the second case illustrates a resource allocation conflict between the first and second network controllers or coexistence managers CM over an allocation of resources for the third WSO that is included in the first and second coexistence sets, in an example embodiment of the invention.
Figure 2C:
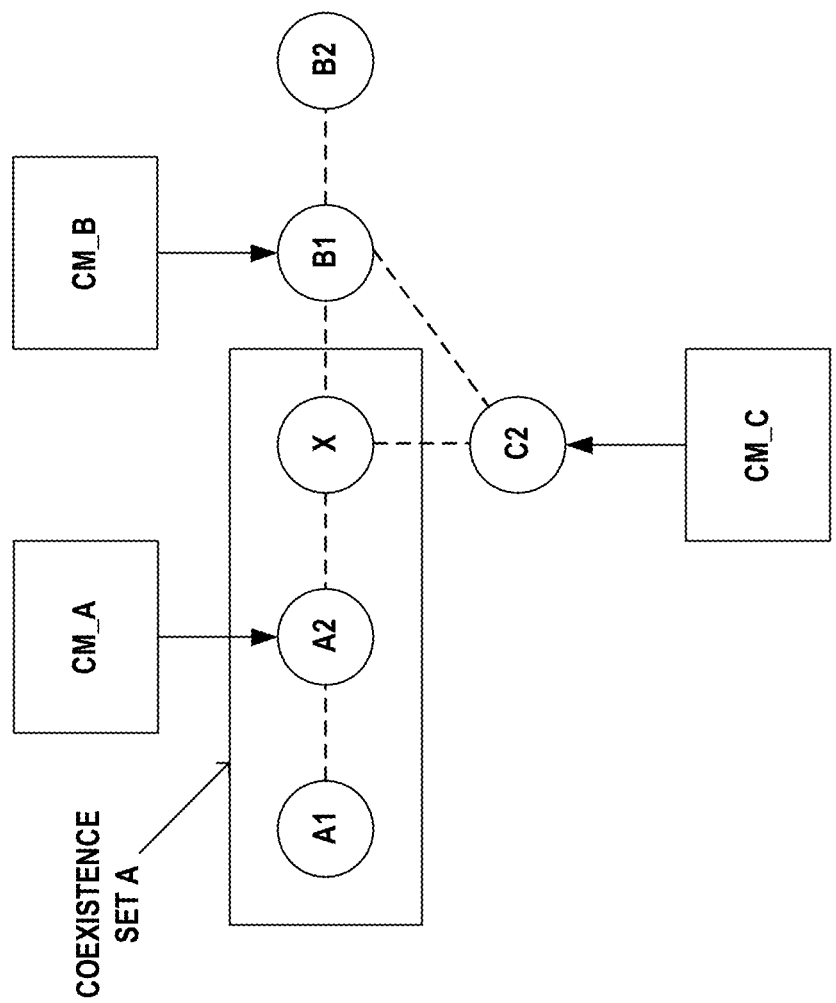
FIG. 2C is the example network diagram of FIG. 2B according to an example embodiment of the invention, showing an example third case of the first, second, and third network controllers or coexistence managers CM of FIG. 2A and the first, second, and third coexistence sets, wherein the third case illustrates a resource allocation where only the first network controllers or coexistence managers CM is calculating an allocation of resources for the third WSO that is included in the first coexistence set, in an example embodiment of the invention.

The FIGS. 2A, 2B, and 2C have three different exemplary cases illustrated. In all the cases there are three CMs illustrated (CM_A, CM_B and CM_C) and each of them serve two WSOs (CM_A serves A1 and A2, CM_B serves B1 and B2, CM_C serves X and C2). The WSOs are interconnected with a dotted line if they may interfere with each other (i.e. dotted line between two WSO indicates that the WSOs are "neighbors"). The example cases have been built around the WSO X that is managed by the CM_C but for which the other two CMs may determine resources as well. This may be generalized to all WSOs to which a resource allocation is calculated.

FIG. 2A is an example network diagram according to an example embodiment of the invention, showing an example first case one of the first and second network controllers or coexistence managers CM_A and CM_C of FIG. 1B and the first coexistence set A for the first WSO A2 and the second coexistence set C and FIG. 2A further showing a third network controller or coexistence manager CM_B and third coexistence set that includes the third WSO X that is a neighbor to both the first WSO A2 and the second WSO C2. The first case illustrates a resource allocation conflict between all three network controllers or coexistence managers CM_A, CM_B, and CM_C over an allocation of resources for the third WSO that is included in all three coexistence sets A, B, and C, in an example embodiment of the invention.

The case 1 represents situations in which at least two CMs are calculating resources to a WSO (X) and one of them is the CM that serves the WSO (X).

In the example, the CM_A is calculating resources to the A2 and its coexistence set (represented by the rectangular labeled with "Coexistence set A"), the CM_B is calculating resources to the B1 and its coexistence set (represented by the rectangular labeled with "Coexistence set B"), and the CM_C is calculating resources to the C2 and its coexistence set (represented by the rectangular labeled with "Coexistence set C").

FIG. 2B is the example network diagram of FIG. 2A according to an example embodiment of the invention, showing an example second case of the first, second, and third network controllers or coexistence managers CM_A, CM_B, CM_C of FIG. 2A and the first and second coexistence sets A and B, wherein the second case illustrates a resource allocation conflict between the first and second network controllers or coexistence managers CM_A, CM_B, over an allocation of resources for the third WSO X that is included in the first and second coexistence sets A and B, in an example embodiment of the invention.

The case 2 represents situations in which at least two CMs are calculating resources to a WSO (X) but the CM that serves the WSO (X) is not any of them.

In the example, the CM_A is calculating resources to the A2 and its coexistence set (represented by the rectangle) and the CM_B is calculating resources to the B1 and its coexistence set (represented by the rectangle).

FIG. 2C is the example network diagram of FIG. 2B according to an example embodiment of the invention, showing an example third case of the first, second, and third network controllers or coexistence managers CM_A, CM_B, CM_C of FIG. 2A and the first coexistence set A, wherein the third case illustrates a resource allocation where only the first network controllers or coexistence managers CM_A is calculating an allocation of resources for the third WSO X that is included in the first coexistence set A, in an example embodiment of the invention.

The case 3 represents situations in which only one CM is calculating resource to a WSO.

In the example, the CM_A is calculating resources to the A2 and its coexistence set (represented by the rectangle).

Assume that the CM_A has proceeded in the resource allocation process to the point in which it has allocation proposal for the A1, A2 and X. The process has been initiated e.g. because of a resource request from the A2 that the CM_A serves. The CM_A notices that one of the WSOs, X, is such a WSO for which other CMs may calculate resources as well. The CM_A transmits a conflict check request message to both the CM_B and CM_C with its allocation proposal for the X.

Note: In this case the CM_A doesn't necessarily have direct connection to the CM_B since the coexistence set of the A2 has no WSOs that are served by the CM_B. The CM_B may, however, determine resources for the X because of the B1 that the CM_B serves. The coexistence set of the B1 contains the X and thus the B1 belongs to the coexistence set extension of the A2 coexistence set. It may be that CMs are directly connected with each other only within the constraints of the coexistence sets. If that is the case, the CMs may need to serve as intermediate nodes in the communication between CMs for conflict handling. In this case, as an example, communication between the CM_A and the CM_B may need to happen via the CM_C. The protocol itself should be no different from the case without intermediate nodes and the forwarding should be a generic operation.

Upon receiving a conflict check request with the allocation proposal from the CM_A the CM_B/CM_C replies with a message indicating their state with respect to the X resource allocation. In the case 1 both the CMs indicate "yes". In the case 2 the CM_B indicates "yes" and the CM_C indicates "no". In the case 3 both the CMs indicate "no".

Once the CM_A has received the responses from the CM_B and CM_C it knows whether there is a conflict case with the X and which CMs are conflict handlers. In the case 1 and case 2 there is a conflict case while in the case 3 there is no conflict case. In the case 1 the conflict handlers are the CM_A, CM_B and CM_C while in the case 2 the CM_A and CM_B are the conflict handlers.

In the case 1 the CM_A waits for a conflict check request from both the CM_B and the CM_C. In the case 2 the CM_A waits for a conflict check request from the CM_B. Once the CM_A has received all the needed conflict request checks with the allocation proposals for the X, it ranks the proposals it has received from the other conflict handlers. Once the ranking is ready the CM_A communicates the ranking to the CM_C that is the CM that serves the X. Same steps are taken by the CM_B and CM_C in the case 1 and in the case 2 these steps are taken by the CM_B in addition to the CM_A. Once the CM_C has received all the required proposal ranking messages it calculates the total score, selects the winning allocation proposal, communicates it to the CM_A/CM_B as required and implements the winning allocation proposal in the X.

Figure 3:
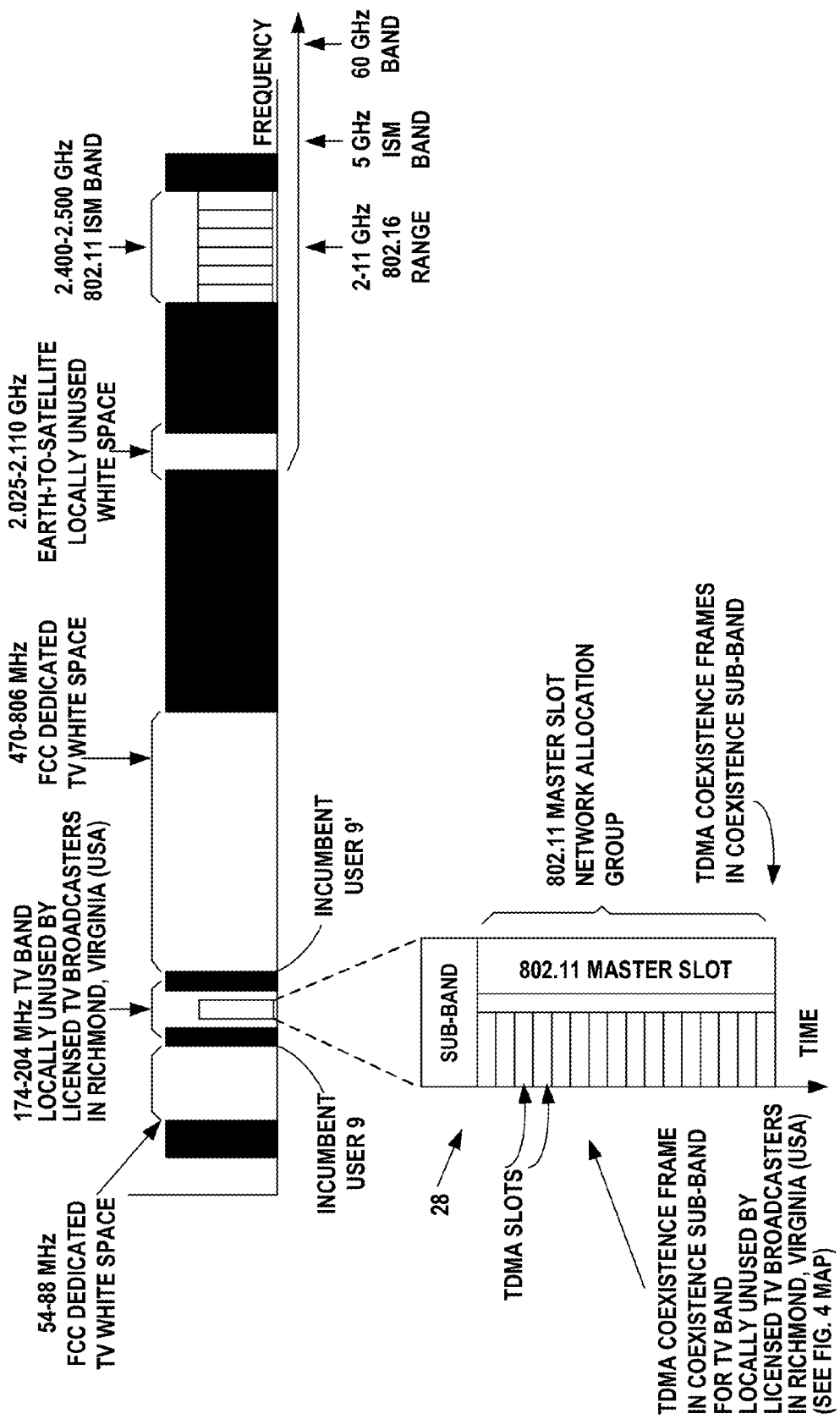
FIG. 3 is a non-limiting example frequency band diagram illustrating an example TDMA coexistence frame sub-band in the TV band white space locally unused by licensed TV broadcasters, representing broadcast TV channels in the Richmond, Va. (USA) area, as shown in FIG. 4, an example TDMA coexistence frame a in sub-band in the FCC dedicated TV band white space, and an example TDMA coexistence frame in a sub-band in the earth station-to-satellite locally unused white space spectrum, according to an embodiment of the present invention.
Figure 4:
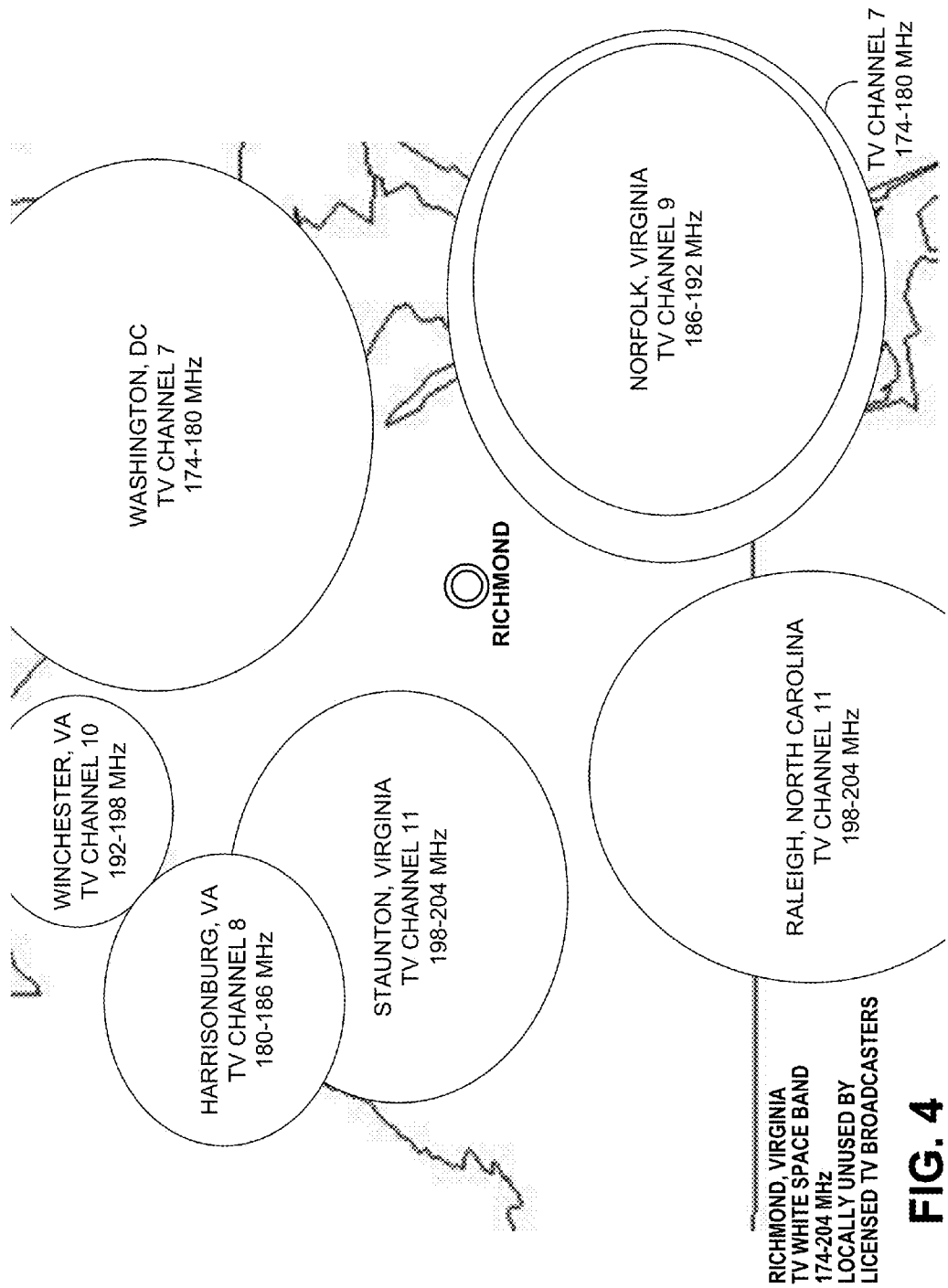
FIG. 4 is an example map of the Richmond, Va. (USA) geographic area and an overlay of coverage areas for broadcast TV channels, illustrating that there is a locally available TV band white space that is unused by licensed TV broadcasters, according to an embodiment of the present invention.

FIG. 3 is a non-limiting example frequency band diagram illustrating an example TDMA coexistence frame sub-band 28 in the TV band white space locally unused by licensed TV broadcasters in the 174-204 MHz band, representing broadcast TV channels 7, 8, 9, 10, and 11 in the Richmond, Va. (USA) area, as shown in FIG. 4, according to an embodiment of the present invention. License-exempt access to these bands as a secondary use for coexistence of networks requesting additional resources, may include restrictions on geographic location, transmission power, range, and bandwidth of the transmissions of the requesting networks.

As a non-limiting example, the 802.11 WLAN standards specify frequencies for operation in the 2.400-2.500 GHz ISM band, the 5 GHz ISM band, and the IEEE 802.11ad Very High Throughput 60 GHz band. The 802.11 WLAN standards specify an OFDM-based physical layer with a bandwidth of 20 MHz channel separation. At 11 MHz from the center of the channel, the energy is approximately 20 dB lower than the maximum signal level. Further away from the center frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space spectrum at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 3 shows a non-limiting example of the location of the white spaces in the RF spectrum and example TDMA coexistence frames in the white space spectrum, showing the freely available time slots before any networks have been allocated slots. The white spaces include the FCC dedicated TV white space 54-88 MHz band, the FCC dedicated TV white space 470-806 MHz band, and locally unused the earth station-to-satellite white space spectrum in 2.025 GHz to 2.110 GHz.

In an example embodiment of the invention, there are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

FIG. 4 shows an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, as shown in FIG. 3. The cities where there are TV broadcasters for TV channels 7, 8, 9, 10, and 11 in a circular area of approximately 160 kilometers in diameter surrounding the city of Richmond, Va., are shown in the following table. The map of FIG. 4 shows that there is no coverage by licensed TV broadcasters in the 174-204 MHz band, which is therefore a locally available TV band white space.

| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 5A:
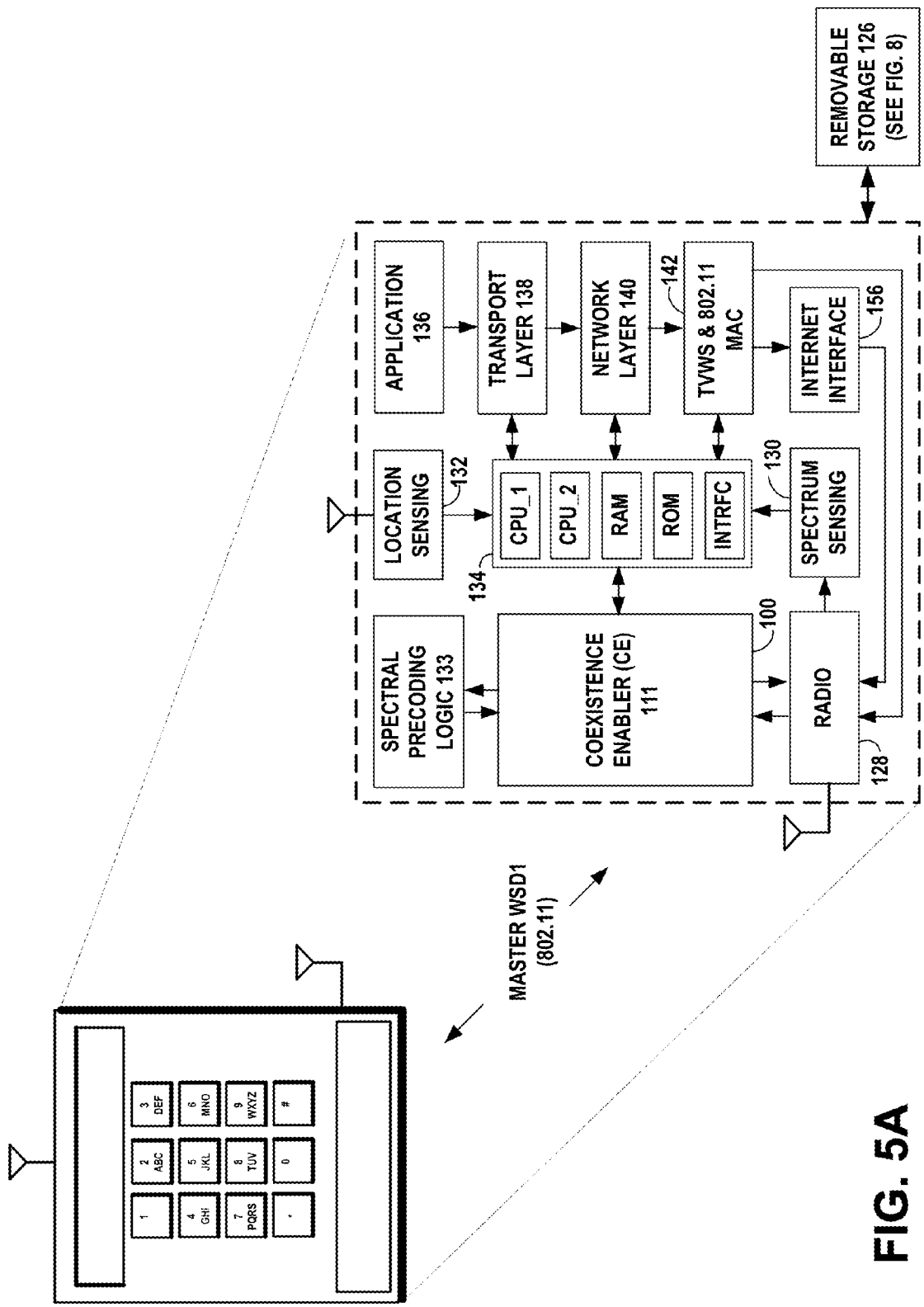
FIG. 5A is a functional block diagram according to an example embodiment of the invention, illustrating an example master WSD1 device including the control node or coexistence enabler for the wireless device. The device may be configured to operate in the TVWS coexistence bands or additional RF spectrum white space spectrum where there may be no primary user radios operating in the neighboring wireless networks, in an example embodiment of the invention.

FIG. 5A is a functional block diagram according to an example embodiment of the invention, illustrating an example master WSD1 device including the control node or coexistence enabler 111 for the wireless device. The device may be configured to operate in the TVWS coexistence bands or additional RF spectrum bands where there may be no primary user radios operating in the neighboring wireless networks, in an example embodiment of the invention.

In an example embodiment of the invention, master WSD1 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example master WSD1 may include a processor 134 that includes a dual or multi core central processing unit CPU_1 and CPU_2, a RAM memory, a ROM memory, and an interface for a keypad, display, and other input/output devices. A location sensor 132, such as a GPS may be included to establish the geographic location of the master WSD1, and the location of the master WSD1 is reported to the network controller or coexistence manager CM_C. The coexistence enabler 111 may send resource requests to the coexistence manager CM_C. The MAC 142 includes integrated TV white space features to communicate using the radio 128 in channels in the TV white spaces band reallocated by the coexistence manager CM_C, without mutual interference. The spectrum sensor 130 senses the electromagnetic environment of the master WSD1 and reports it to the coexistence manager CM_C.

Figure 5B:
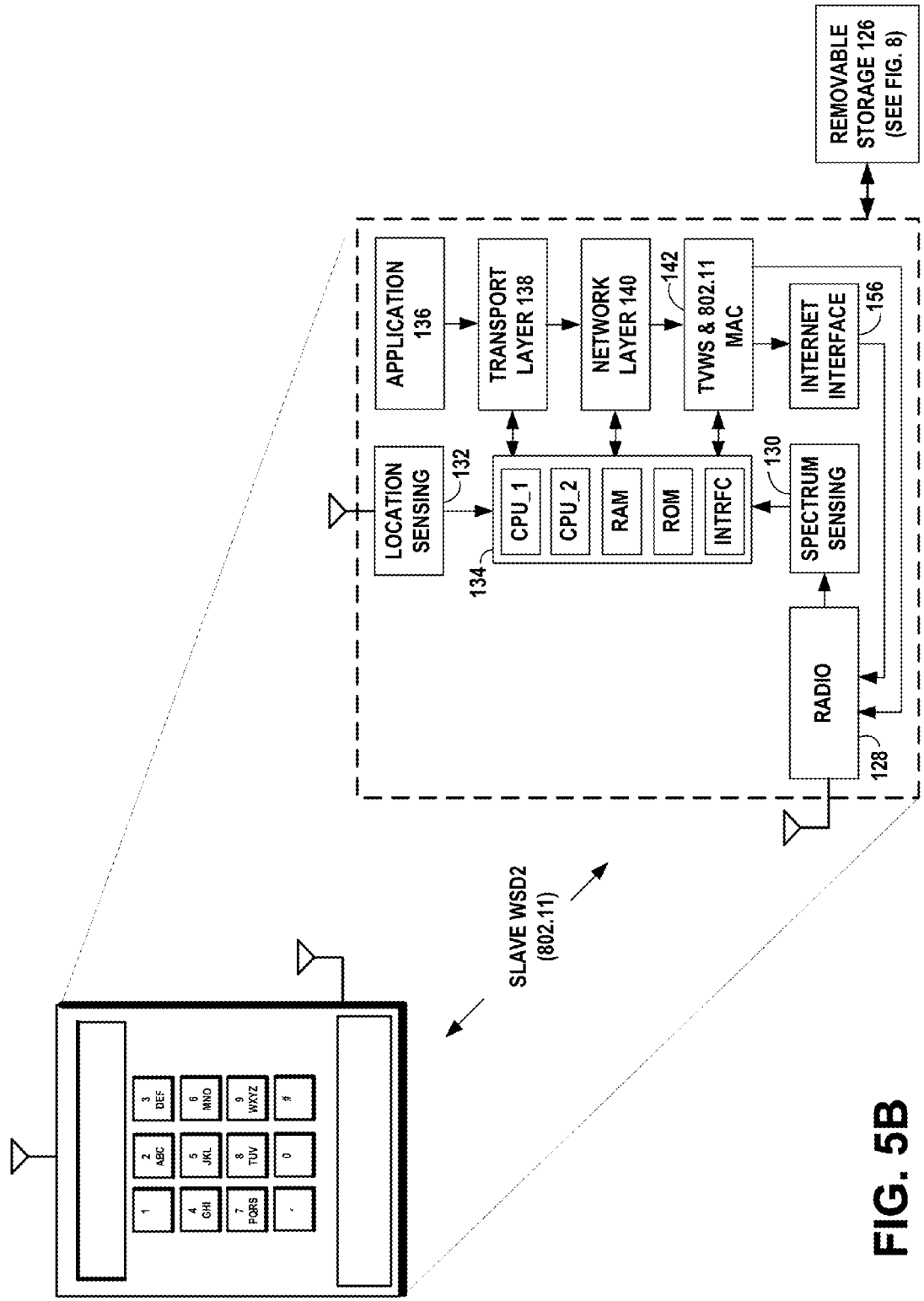
FIG. 5B is a functional block diagram according to an example embodiment of the invention, illustrating an example slave WSD device including the control node or coexistence enabler for the wireless device. The device may be configured to operate in the TVWS coexistence bands or additional RF spectrum white space spectrum there may be no primary user radios operating in the neighboring wireless networks, in an example embodiment of the invention.
Figure 5C:
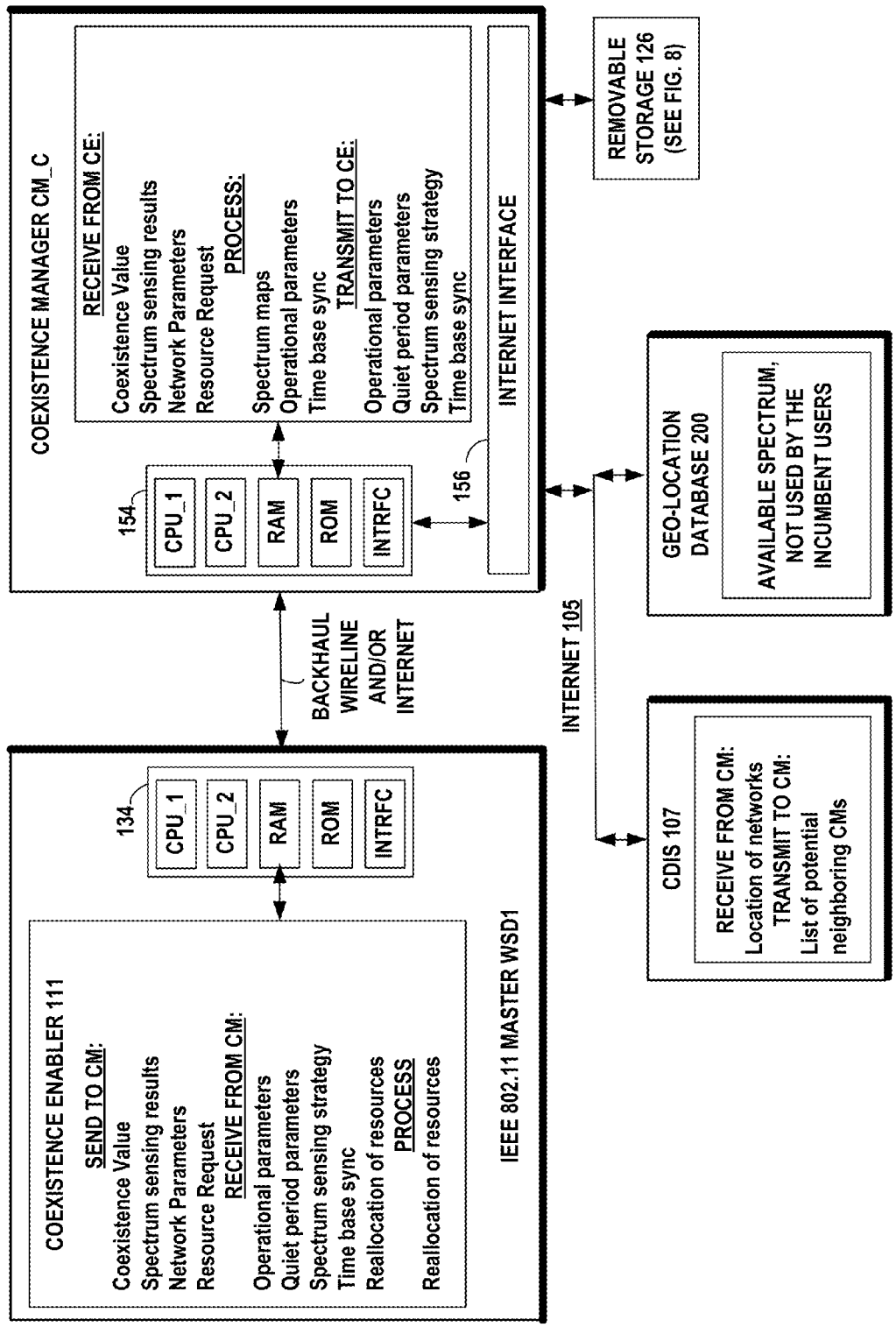
FIG. 5C is an example network diagram according to an embodiment of the present invention, illustrating the control node or coexistence enabler, communicating over a backhaul wireline and/or internet link with the network controller or coexistence manager, in an example embodiment of the invention.

In an example embodiment of the invention, the geo-location database 200 of FIG. 5C, may communicate the allowed emission levels via the Internet 105 to the coexistence manager CM_C, which forwards the allowed emission levels via the Internet 105 to coexistence enabler 111 in the master WSD1.

In an example embodiment of the invention, the master WSD1 includes spectral decoding logic 133. When input data are not properly correlated, a rectangularly-pulsed OFDM signal is discontinuous in phase and thus exhibits large power spectral sidelobes decaying asymptotically as the frequency. Such large sidelobes cause strong interference to adjacent channels and need to be suppressed before transmission. Spectral precoding is capable of suppressing sidelobe powers effectively without trading off system error performance or implementation complexity. By spectral precoding, significant sidelobe suppression is achieved by precoding data symbols in frequency domain without resort to specific data values. The idea is to introduce correlation among data symbols by a fixed precoder matrix in a way that the spectrally-precoded rectangularly-pulsed OFDM signal exhibits extremely small power spectral sidelobes decaying asymptotically, and thereby high spectral efficiency. Spectral precoders are all invertible and thus enable realizable decoding at the receiver while providing good system error performance. An example spectral decoder is described in the publication by Char-Dir Chung, "Spectral Precoding for Constant-Envelope OFDM", *IEEE Transactions on Communications*, vol. 58, no. 2, February 2010, pages 555-567.

In an example embodiment of the invention, the interface circuits in FIG. 5A may interface with one or more radio transceivers, battery and other power sources, key pad, touch screen, display, microphone, speakers, ear pieces, camera or other imaging devices, etc. The RAM and ROM may be removable memory devices such as smart cards, subscriber identity modules (SIMs), wireless identification modules (WIMs), semiconductor memories such as RAM, ROM, PROMS, flash memory devices, etc, as shown in FIG. 9. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

The master WSD1 of FIG. 5A includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards (SD refers to the Secure Digital standard) are shown at 126 and in FIG. 8, and may serve, for instance, as a data input/output means. Code may include any interpreted or compiled computer language including computer-executable instructions. The code and/or data may be used to create software modules such as operating systems, communication utilities, user interfaces, more specialized program modules, etc.

FIG. 5B is a functional block diagram according to an example embodiment of the invention, illustrating an example slave WSD2 device. The device may be configured to operate in the TVWS coexistence bands or additional RF spectrum bands there may be no primary user radios operating in the neighboring wireless networks, in an example embodiment of the invention.

In an example embodiment of the invention, slave WSD2 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example slave WSD2 may include a processor 134 that includes a dual or multi core central processing unit CPU_1 and CPU_2, a RAM memory, a ROM memory, and an interface for a keypad, display, and other input/output devices. A location sensor 134, such as a GPS may be included to establish the geographic location of the slave WSD2, and the location of the slave WSD2 is reported to the network controller or coexistence manager CM_C. The MAC 142 includes integrated TV white space features to communicate using the radio 128 in channels in the TV white spaces band reallocated by the coexistence manager CM_C, without mutual interference. The spectrum sensor 130 senses the electromagnetic environment of the slave WSD2 and reports it to the master WSD2 that may provide the reports to the coexistence enabler for further processing and delivery to the coexistence manager CM_C.

In an example embodiment of the invention, the geo-location database 200 may communicate the allowed emission levels via the Internet 105 to the coexistence manager CM_C, which forwards the allowed emission levels to the slave WSD2 via the coexistence enabler 111 in the master WSD1 and the master WSD1 itself.

In an example embodiment of the invention, the interface circuits in FIG. 5B may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc, as shown in FIG. 9. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

The slave WSD2 of FIG. 5B includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards are shown at 126 and in FIG. 8, and may serve, for instance, as a data input/output means. Code may include any interpreted or compiled computer language including computer-executable instructions. The code and/or data may be used to create software modules such as operating systems, communication utilities, user interfaces, more specialized program modules, etc.

FIG. 5C is an example network diagram according to an embodiment of the present invention, illustrating the control node or coexistence enabler 111, communicating over a backhaul wireline and/or internet link with the network controller or coexistence manager CM_C, in an example embodiment of the invention. The coexistence manager CM_C may communicate over the internet 105 with the geo-location database 200 and the coexistence network element coexistence discovery and Information server (CDIS) 107, in an example embodiment of the invention.

A master WSD, such as WSD1, may send queries for the available spectrum to a geo-location database 200. Database 200 may comprise some internal structure, for example, in form functional blocks such as processors, memory, software/hardware modules, and the like, for performing operations described herein. Such blocks may for example transmit and receive information such as spectrum information, emission characteristics, and/or allowed operating parameters. The master WSD1 uses the IEEE 802.11 wireless LAN (WLAN) protocol for is normal communications on its IEEE 802.11 links, but it is capable of communicating in white space spectrum on TVWS links 2, 3, and 4. The returned information from the geo-location database 200 enables the operation in the white space spectrum, of both the master WSD1 and its associated slave WSD2 that is within the master WSD1's operational area. There may be other reasons to use TVWS, such as better propagation. Normal communication medium typically is available for WLAN (e.g. 2.4 or 5 GHz), but TVWS may not be available everywhere due primary users.

Figure 6A:
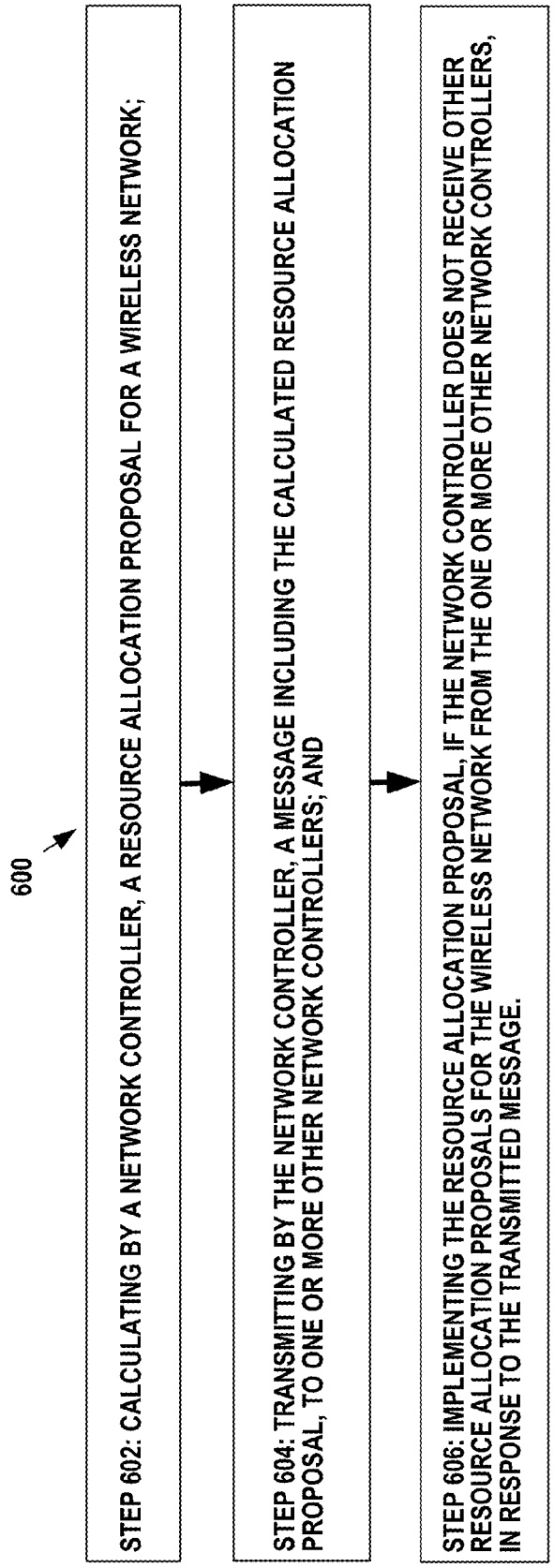
FIG. 6A is an example flow diagram of operational steps in an originating network controller that receives a resource allocation request from a wireless network, according to an embodiment of the present invention.

FIG. 6A is an example flow diagram of operational steps in an originating network controller CM_A that receives a resource allocation request from a wireless network A2, according to an embodiment of the present invention. The steps of the flow diagram 600 of FIG. 6A may represent computer code instructions stored in the RAM and/or ROM memory of the master white space device, which when executed by the central processing units (CPU), carry out the functions of an example embodiment of the invention. The steps may be carried out in another order than shown and individual steps may be combined or separated into component steps.

Step 602: calculating by a network controller, a resource allocation proposal for a wireless network;

Step 604: transmitting by the network controller, a message including the calculated resource allocation proposal, to one or more other network controllers; and Step 606: implementing the resource allocation proposal, if the network controller does not receive other resource allocation proposals for the wireless network from the one or more other network controllers, in response to the transmitted message.

Figure 6B:
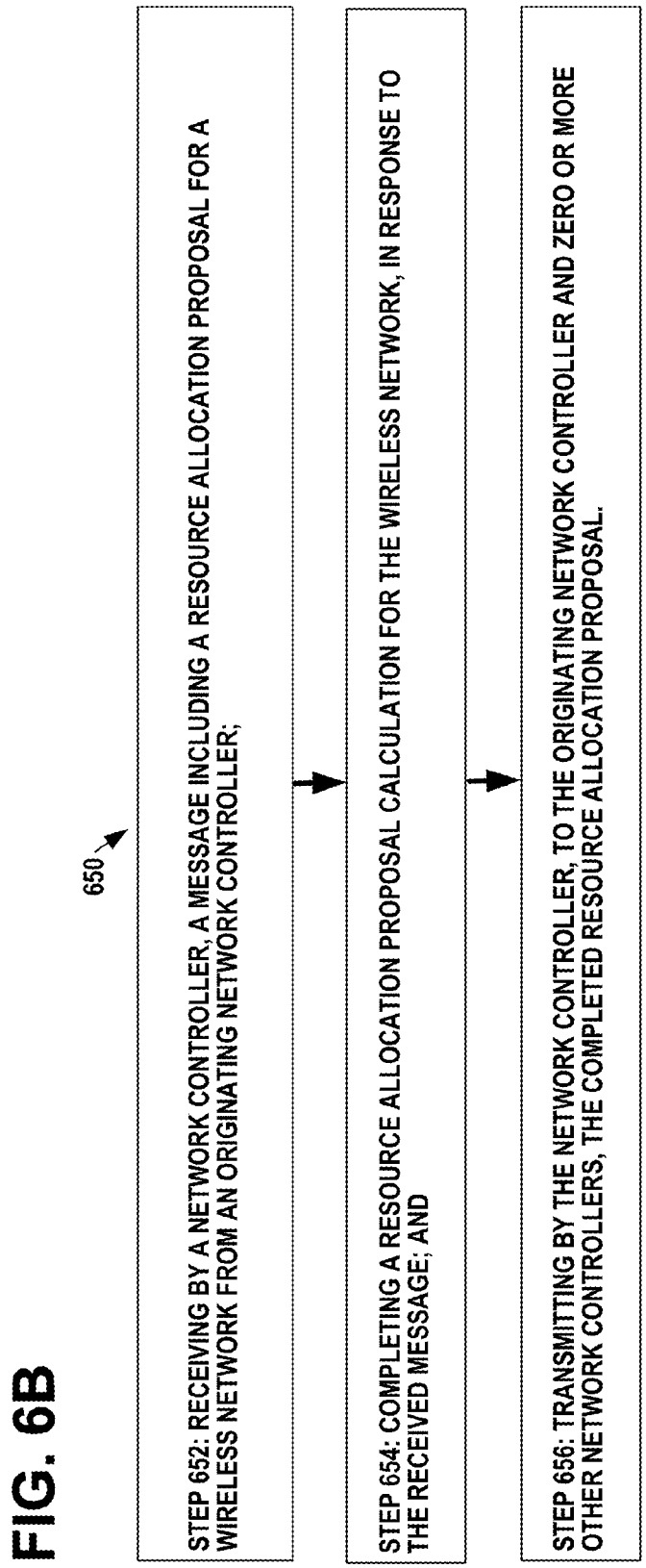
FIG. 6B is an example flow diagram of operational steps in a network controller that receives a conflict request and a resource allocation proposal from the originating network controller, according to an embodiment of the present invention.

FIG. 6B is an example flow diagram of operational steps in a network controller CM_C that receives a conflict request and a resource allocation proposal from the originating network controller CM_A, according to an embodiment of the present invention.

The steps of the flow diagram 650 of FIG. 6B may represent computer code instructions stored in the RAM and/or ROM memory of the slave white space device, which when executed by the central processing units (CPU), carry out the functions of an example embodiment of the invention. The steps may be carried out in another order than shown and individual steps may be combined or separated into component steps.

Step 652: receiving by a network controller, a message including a resource allocation proposal for a wireless network from an originating network controller;

Step 654: completing a resource allocation proposal calculation for the wireless network, in response to the received message; and Step 656: transmitting by the network controller, to the originating network controller and zero or more other network controllers, the completed resource allocation proposal.

FIG. 6C is an example flow diagram of operational steps in a network controller CM_C that serves one or more wireless networks X neighboring the wireless network A2 originating the resource allocation request, according to an embodiment of the present invention.

The steps of the flow diagram 680 of FIG. 6C may represent computer code instructions stored in the RAM and/or ROM memory of the slave white space device, which when executed by the central processing units (CPU), carry out the functions of an example embodiment of the invention. The steps may be carried out in another order than shown and individual steps may be combined or separated into component steps.

Step 682: receiving by a network controller serving a wireless network, rankings of resource allocation proposals received from one or more other network controllers;

Step 684: determining by the network controller, a score value for each resource allocation proposal received from the one or more other network controllers based on the received rankings of resource allocation proposals;

Step 686: selecting by the network controller, a resource allocation proposal depending on the determined score values; and Step 688: implementing the selected resource allocation proposal in the wireless network.

FIG. 7 is an example frequency band diagram illustrating an example TDMA coexistence frame 24' in sub-band 14' in an unpaired time domain duplex frequency white space of 900 to 905 MHz in the uplink portion of a mobile device communications frequency band, according to an example embodiment of the invention. FIG. 7 illustrates an example frequency plan for the example mobile device frequency band, with an uplink portion between 890 and 915 MHz and a down link portion between 935 and 960 MHz, similar to a portion of the frequency plan for GSM. In the example frequency plan shown in FIG. 7, a 5 MHz band between 945 and 950 MHz in the down link portion is reserved for other uses, for example as an emergency services band. Since the time domain duplex operation of the mobile device system requires matched uplink frequencies to the allocated down link frequencies, there is an unpaired band between 900 and 905 MHz in the uplink portion. In accordance with an example embodiment of the invention, the unpaired band between 900 and 905 MHz is used as a coexistence band. FIG. 7 shows an example TDMA coexistence frame 24' in sub-band 14' in the unpaired time domain duplex frequency white space 36 in the uplink portion of the mobile device frequency band, which may be used by the cell base master device WSD5 and the cell slave devices WSD6, WSD7, and WSD8 in FIG. 1A.

Figure 8:
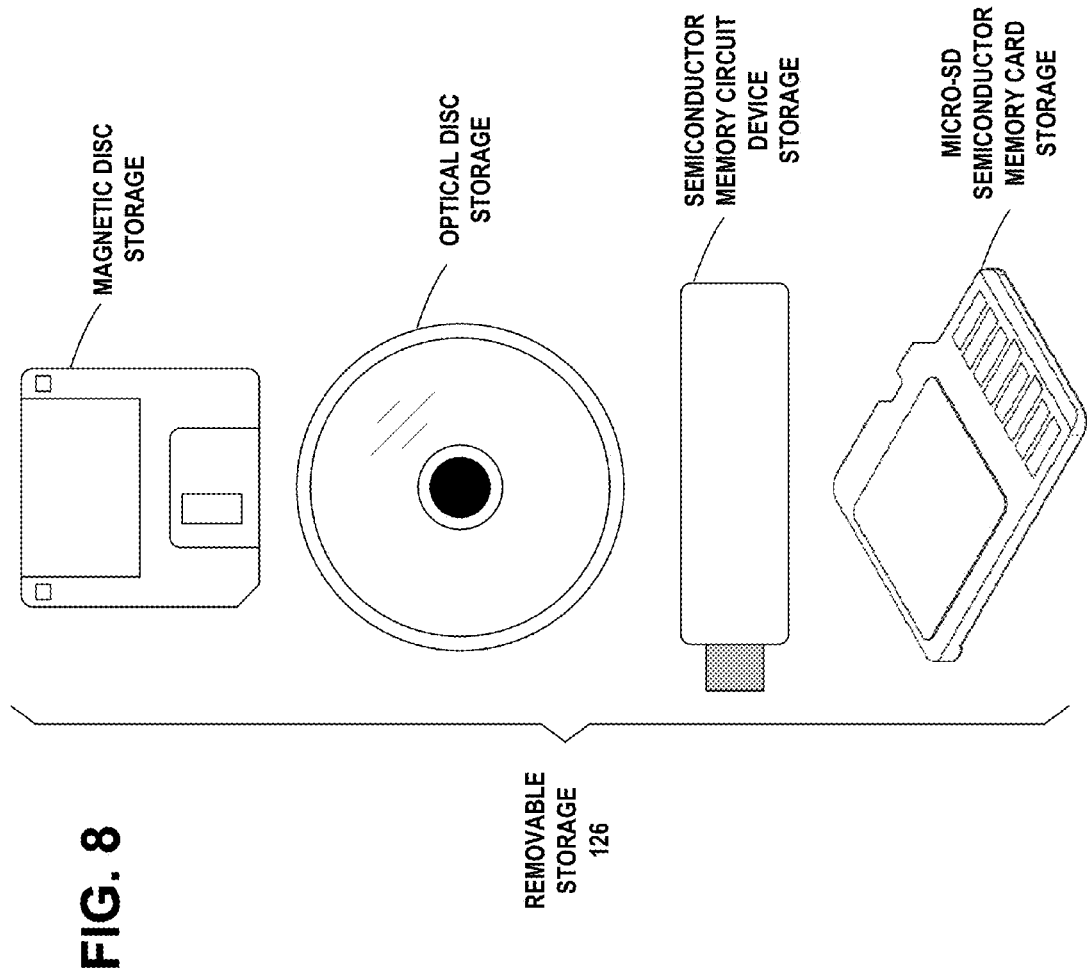
FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 8 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard), for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, phone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

The invention claimed is:

1. A method, comprising:
calculating by a network controller, a resource allocation proposal for a wireless network;
transmitting by the network controller, a message including conflict request and the calculated resource allocation proposal to one or more other network controllers, to determine whether they are calculating other resource allocation proposals for the wireless network originating the request or for one or more wireless networks neighboring the wireless network originating the request; and
implementing the resource allocation proposal, if the network controller does not receive other resource allocation proposals for the wireless network from the one or more other network controllers, in response to the transmitted message.

2. The method of claim 1, further comprising:
receiving a response message from the one or more other network controllers indicating whether they are in the process of calculating resources for the wireless network originating the request or for one or more wireless networks neighboring the wireless network originating the request;
ranking by the network controller, if the network controller receives other resource allocation proposals for the wireless network from the one or more other network controllers in response to the transmitted message, the other resource allocation proposals; and
transmitting by the network controller, a result of the ranking of the other resource allocation proposals, to one or more network controllers serving the wireless network.

3. A method, comprising:
receiving by a network controller, a message including a conflict request and a resource allocation proposal for a wireless network originating the request, from an originating network controller, to determine whether the network controller is calculating a resource allocation proposal for the wireless network originating the request or for one or more wireless networks neighboring the wireless network originating the request;
completing a resource allocation proposal calculation for the wireless network originating the request, in response to the received message; and
transmitting by the network controller, to the originating network controller and zero or more other network controllers, the completed resource allocation proposal.

4. The method of claim 3, further comprising:
ranking by the network controller, the resource allocation proposal received from the originating network controller and zero or more other resource allocation proposals received from zero or more other network controllers respectively, in response to the transmitted message; and
transmitting by the network controller, a result of ranking the received one or more resource allocation proposals, to one or more network controllers serving the wireless network originating the request.

5. The method of claim 3, further comprising:
receiving by the network controller, a message including a resource allocation proposal for one or more wireless networks neighboring the wireless network from an originating network controller; and
completing a resource allocation proposal calculation for the for one or more wireless networks neighboring the wireless network, in response to the message.

6. A method, comprising:
receiving by a network controller serving a wireless network, rankings of resource allocation proposals received from one or more other network controllers;
determining by the network controller, a score value for each resource allocation proposal received from the one or more other network controllers based on the received rankings of resource allocation proposals;
selecting by the network controller, a resource allocation proposal depending on the determined score values; and
implementing the selected resource allocation proposal in the wireless network.

7. The method of claim 6, which further comprises:
wherein the selected resource allocation proposal has a highest determined score value.

8. The method of claim 6, further comprising:
transmitting an indication of the selected resource allocation proposal to one or more other network controllers;
wherein resource allocations in the selected resource allocation proposal are a set of one or more channels for use for a wireless network.

9. An apparatus, comprising:
at least one processor;
at least one memory including computer program code;
the at least one memory and the computer program code configured to, with the at least one processor, cause the apparatus at least to:
calculate a resource allocation proposal for a wireless network;
transmit a message including conflict request and the calculated resource allocation proposal to one or more other network controllers, to determine whether they are calculating other resource allocation proposals for the wireless network originating the request or for one or more wireless networks neighboring the wireless network originating the request; and
implement the resource allocation proposal, if other resource allocation proposals are not received for the wireless network from the one or more other network controllers, in response to the transmitted message.

10. The apparatus of claim 9, further comprising:
the at least one memory and the computer program code configured to, with the at least one processor, cause the apparatus at least to:
receive a response message from the one or more other network controllers indicating whether they are in the process of calculating resources for the wireless network originating the request or for one or more wireless networks neighboring the wireless network originating the request;
rank, if the apparatus receives other resource allocation proposals from the one or more other network controllers in response to the transmitted message, the other resource allocation proposals; and
transmit a result of the ranking of the other resource allocation proposals, to one or more network controllers serving the wireless network.

11. An apparatus, comprising:
at least one processor;
at least one memory including computer program code;
the at least one memory and the computer program code configured to, with the at least one processor, cause the apparatus at least to:
receive a message including a conflict request and a resource allocation proposal for a wireless network originating the request, from an originating network controller, to determine whether the network controller is calculating a resource allocation proposal for the wireless network originating the request or for one or more wireless networks neighboring the wireless network originating the request;
complete a resource allocation proposal calculation for the wireless network originating the request, in response to the received message; and
transmit to the originating network controller and zero or more other network controllers, the completed resource allocation proposal.

12. The apparatus of claim 11, further comprising:
the at least one memory and the computer program code configured to, with the at least one processor, cause the apparatus at least to:
rank the resource allocation proposal received from the originating network controller and zero or more other resource allocation proposals received from zero or more other network controllers respectively, in response to the transmitted message; and
transmit a result of ranking the received one or more resource allocation proposals, to one or more network controllers serving the wireless network originating the request.

13. The apparatus of claim 11, further comprising:
the at least one memory and the computer program code configured to, with the at least one processor, cause the apparatus at least to:
receive a message including a resource allocation proposal for one or more wireless networks neighboring the wireless network from an originating network controller; and
complete a resource allocation proposal calculation for the one or more wireless networks neighboring the wireless network, in response to the message.

14. An apparatus, comprising:
at least one processor;
at least one memory including computer program code;
the at least one memory and the computer program code configured to, with the at least one processor, cause the apparatus at least to:
receive rankings of resource allocation proposals received from one or more other network controllers, the apparatus serving a wireless network;
determine a score value for each resource allocation proposal received from the one or more other network controllers based on the received rankings of resource allocation proposals;
select a resource allocation proposal depending on the determined score values; and
implement the selected resource allocation proposal in the wireless network.

15. The apparatus of claim 14, further comprising:
wherein the selected resource allocation proposal has a highest determined score value.

16. The apparatus of claim 14, further comprising:
the at least one memory and the computer program code configured to, with the at least one processor, cause the apparatus at least to:
transmit an indication of the selected resource allocation proposal to one or more other network controllers;
wherein resource allocations in the selected resource allocation proposal are a set of one or more channels for use for a wireless network.

17. A computer program product comprising computer executable program code recorded on a computer readable, non-transitory storage medium, the computer executable program code comprising:

code for calculating a resource allocation proposal for a wireless network;

code for transmitting by the network controller, a message including conflict request and the calculated resource allocation proposal to one or more other network controllers, to determine whether they are calculating other resource allocation proposals for the wireless network originating the request or for one or more wireless networks neighboring the wireless network originating the request; and code for implementing the resource allocation proposal, if other resource allocation proposals are not received for the wireless network from the one or more other network controllers, in response to the transmitted message.

18. The computer program product of claim 17, further comprising:

code for receiving a response message from the one or more other network controllers indicating whether they are in the process of calculating resources for the wireless network originating the request or for one or more wireless networks neighboring the wireless network originating the request;

code for ranking, if other resource allocation proposals are received from the one or more other network controllers in response to the transmitted message, the other resource allocation proposals; and code for transmitting a result of the ranking of the other resource allocation proposals, to one or more network controllers serving the wireless network.

19. A computer program product comprising computer executable program code recorded on a computer readable, non-transitory storage medium, the computer executable program code comprising:

code for receiving by a network controller, a message including a conflict request and a resource allocation proposal for a wireless network originating the request, from an originating network controller, to determine whether the network controller is calculating a resource allocation proposal for the wireless network originating the request or for one or more wireless networks neighboring the wireless network originating the request;

code for completing a resource allocation proposal calculation for the wireless network originating the request, in response to the received message; and transmitting to the originating network controller and zero or more other network controllers, the completed resource allocation proposal.

20. The computer program product of claim 19, further comprising:

code for ranking the resource allocation proposal received from the originating network controller and zero or more other resource allocation proposals received from zero or more other network controllers respectively, in response to the transmitted message; and code for transmitting a result of ranking the received one or more resource allocation proposals, to one or more network controllers serving the wireless network originating the request.

21. The computer program product of claim 19, further comprising:

code for receiving a message including a resource allocation proposal for one or more wireless networks neighboring the wireless network from an originating network controller; and code for completing a resource allocation proposal calculation for the one or more wireless networks neighboring the wireless network, in response to the message.

22. A computer program product comprising computer executable program code recorded on a computer readable, non-transitory storage medium, the computer executable program code comprising:

code for receiving rankings of resource allocation proposals received from one or more network controllers, by an apparatus serving a wireless network;

code for determining a score value for each resource allocation proposal received from the one or more network controllers based on the received rankings of resource allocation proposals;

code for selecting a resource allocation proposal depending on the determined score values; and code for implementing the selected resource allocation proposal in the wireless network.

23. The computer program product of claim 22, further comprising:

wherein the selected resource allocation proposal has a highest determined score value.

24. The computer program product of claim 22, further comprising:

code for transmitting an indication of the selected resource allocation proposal to one or more other network controllers;

wherein resource allocations in the selected resource allocation proposal are a set of one or more channels for use for a wireless network.

25. A method, comprising:

ranking by a network controller, resource allocation proposals received from one or more other network controllers serving a wireless network;

transmitting by the network controller, a result of ranking the received one or more resource allocation proposals, to the one or more other network controllers serving the wireless network;

receiving by the network controller, an indication of a selection of a resource allocation proposal received from the one or more other network controllers; and implementing the selected resource allocation proposal.

26. The method of claim 25, further comprising:

determining by the network controller, a score value for each resource allocation proposal received from the one or more other network controllers based on the rankings of resource allocation proposals by the network controller; and selecting by the network controller, a resource allocation proposal depending on the determined score values, as a result of ranking.

27. The method of claim 25, further comprising:

wherein resource allocations in the selected resource allocation proposal are a set of one or more channels for use for a wireless network.

28. An apparatus, comprising:

at least one processor;

at least one memory including computer program code;

the at least one memory and the computer program code configured to, with the at least one processor, cause the apparatus at least to:

rank resource allocation proposals received from one or more other network controllers serving a wireless network;

transmit a result of ranking the received one or more resource allocation proposals, to the one or more other network controllers serving the wireless network;

receive an indication of a selection of a resource allocation proposal received from the one or more other network controllers; and implement the selected resource allocation proposal.

29. The apparatus of claim 28, further comprising:

the at least one memory and the computer program code configured to, with the at least one processor, cause the apparatus at least to:

determine a score value for each resource allocation proposal received from the one or more other network controllers based on the rankings of resource allocation proposals by the network controller; and select a resource allocation proposal depending on the determined score values, as a result of ranking.

30. The apparatus of claim 28, further comprising:

wherein resource allocations in the selected resource allocation proposal are a set of one or more channels for use for a wireless network.

31. A computer program product comprising computer executable program code recorded on a computer readable, non-transitory storage medium, the computer executable program code comprising:

code for ranking by a network controller, resource allocation proposals received from one or more other network controllers serving a wireless network;

code for transmitting by the network controller, a result of ranking the received one or more resource allocation proposals, to the one or more other network controllers serving the wireless network;

code for receiving by the network controller, an indication of a selection of a resource allocation proposal received from the one or more other network controllers; and code for implementing the selected resource allocation proposal.

32. The computer program product of claim 31, further comprising:

code for determining by the network controller, a score value for each resource allocation proposal received from the one or more other network controllers based on the rankings of resource allocation proposals by the network controller; and code for selecting by the network controller, a resource allocation proposal depending on the determined score values, as a result of ranking.

33. The computer program product of claim 31, further comprising:

wherein resource allocations in the selected resource allocation proposal are a set of one or more channels for use for a wireless network.

\* \* \* \* \*